US012654346B2

(12) United States Patent
Kim et al.

(10) Patent No.: US 12,654,346 B2
(45) Date of Patent: Jun. 16, 2026

(54) RAZOR ASSEMBLY

(71) Applicant: DORCO CO., LTD., Seoul (KR)

(72) Inventors: Dong Il Kim, Seoul (KR); Se Jun Jang, Seoul (KR); Eun Hye Jo, Seoul (KR); Na Yeon Yoo, Seoul (KR)

(73) Assignee: Dorco Co., Ltd., Seoul (KR)

( * ) Notice: Subject to any disclaimer, the term of this patent is extended or adjusted under 35 U.S.C. 154(b) by 325 days.

(21) Appl. No.: 17/324,839

(22) Filed: May 19, 2021

(65) Prior Publication Data

US 2021/0379782 A1 Dec. 9, 2021

(30) Foreign Application Priority Data

Jun. 3, 2020 (KR) ........................ 10-2020-0066857

(51) Int. Cl.
*B26B 21/52* (2006.01)
*B26B 21/10* (2006.01)
(Continued)

(52) U.S. Cl.
CPC ............ *B26B 21/521* (2013.01); *B26B 21/10* (2013.01); *B26B 21/14* (2013.01); *B26B 21/222* (2013.01);
(Continued)

(58) Field of Classification Search
CPC ..... B26B 21/225; B26B 21/525; B26B 21/52; B26B 21/4075; B26B 21/20; B26D 21/14; B26D 21/4068
See application file for complete search history.

(56) References Cited

U.S. PATENT DOCUMENTS 3,938,247 A * 2/1976 Carbonell ............. B26B 21/225 30/47
4,083,104 A * 4/1978 Nissen .................. B26B 21/521 30/47
(Continued)

FOREIGN PATENT DOCUMENTS

EP 1136197 9/2001
EP 3546156 10/2019
(Continued)

OTHER PUBLICATIONS

Korean Intellectual Property Office Application No. 10-2020-0066857, Office Action dated May 2, 2022, 6 pages.
(Continued)

*Primary Examiner* — Boyer D Ashley
*Assistant Examiner* — Samuel A Davies
(74) *Attorney, Agent, or Firm* — Knobbe Martens Olson & Bear LLP

(57) ABSTRACT

In some embodiments, the present disclosure provides a razor assembly including a razor cartridge, razor handle, and recovering force-providing unit. The razor cartridge includes a shaving blade having a cutting edge and a blade housing receiving the shaving blade longitudinally. The razor handle is connected to the razor cartridge rotatably about a first rotational axis parallel to longitudinal direction within a rotation range. The recovering force-providing unit provides the razor cartridge rotated about the first rotational axis from a rest position with recovering force returning the razor cartridge to the rest position. The rotation range includes a first pivot section between the rest position and first angle, and a second pivot section between the first angle and a greater second angle. The recovering force increases as the razor cartridge rotates with an increasing rotational
(Continued)

angle, at an increasing rate that differs between the first and second pivot sections.

12 Claims, 18 Drawing Sheets

(51) Int. Cl.
*B26B 21/14* (2006.01)
*B26B 21/22* (2006.01)
*B26B 21/44* (2006.01)
*B26B 21/48* (2006.01)

(52) U.S. Cl.
CPC .............. *B26B 21/44* (2013.01); *B26B 21/48* (2013.01); *B26B 21/525* (2013.01)

(56) References Cited

U.S. PATENT DOCUMENTS

| | | | | | |
|---|---|---|---|---|---|
| 4,739,553 | A * | 4/1988 | Lazarchik | B26B 21/521 30/47 |
| 5,157,834 | A * | 10/1992 | Chen | B26B 21/225 30/47 |
| 5,794,354 | A | 8/1998 | Gilder | |
| 5,953,825 | A * | 9/1999 | Christman | B26B 21/225 30/527 |
| 6,425,184 | B1 * | 7/2002 | Min | B26B 21/225 30/526 |
| 6,434,839 | B1 * | 8/2002 | Lee | B26B 21/225 30/527 |
| 7,685,720 | B2 * | 3/2010 | Efthimiadis | B26B 21/38 30/527 |
| 8,151,472 | B2 | 4/2012 | Dimitris et al. | |
| 8,590,162 | B2 * | 11/2013 | Park | B26B 21/225 30/526 |
| 8,671,577 | B2 * | 3/2014 | Brown | B26B 21/521 30/526 |
| 10,427,312 | B2 * | 10/2019 | Gratsias | B26B 21/521 |
| 2002/0138992 | A1 * | 10/2002 | Richard | B26B 21/225 30/527 |
| 2003/0115762 | A1 * | 6/2003 | Follo | B26B 21/521 30/527 |
| 2004/0020053 | A1 * | 2/2004 | Wain | B26B 21/227 30/526 |
| 2006/0260131 | A1 * | 11/2006 | Follo | B26B 21/521 30/527 |
| 2010/0251555 | A1 | 10/2010 | Park et al. | |
| 2010/0313426 | A1 * | 12/2010 | Royle | B26B 21/522 30/84 |
| 2013/0091712 | A1 * | 4/2013 | Schekalla | B26B 5/003 30/162 |
| 2015/0283716 | A1 | 10/2015 | Kim et al. | |
| 2016/0107324 | A1 * | 4/2016 | Robertson | B26B 21/22 30/53 |
| 2020/0039098 | A1 * | 2/2020 | Kopelas | B26B 21/225 |

FOREIGN PATENT DOCUMENTS

| | | | | |
|---|---|---|---|---|
| GB | 2116470 | A * | 9/1983 | B26B 21/225 |
| KR | 20-2000-0020091 | | 11/2000 | |
| KR | 10-2008-0105676 | | 12/2008 | |
| KR | 10-2014-0050220 | | 4/2014 | |
| KR | 10-2014-0069811 | | 6/2014 | |
| KR | 10-1457766 | | 12/2014 | |
| WO | 0200401 | | 1/2002 | |

OTHER PUBLICATIONS

European Patent Office Application Serial No. 21176861.9, Partial Search Report dated Nov. 2, 2021, 14 pages.

* cited by examiner (a)

(b)

(c)

(a)

(b)

(c)

RAZOR ASSEMBLY

CROSS-REFERENCE TO RELATED APPLICATIONS

Pursuant to 35 U.S.C. § 119(a), this application claims the benefit of earlier filing date and right of priority to Korean Patent Application Number 10-2020-0066857, filed on Jun. 3, 2020, the contents of which is hereby incorporated by reference herein in its entirety.

TECHNICAL FIELD

The present disclosure in some embodiments relates to a razor assembly.

BACKGROUND

The statements in this section merely provide background information related to the present disclosure and do not necessarily constitute prior art.

A conventional razor assembly, generally known as a wet razor, includes a razor cartridge and a razor handle. The razor cartridge includes a blade housing, a guard bar, a cap, and at least one shaving blade disposed between the guard bar and the cap.

The razor cartridge may be configured to be rotatable about the razor handle between a rest position and a pivot position. The rotational motion of the razor cartridge is made about a rotational axis parallel to the alignment direction of the shaving blade.

The rotational motion of the razor cartridge about the rotational axis helps the shaving blade to smoothly contact the cutting surface, for example, the user's skin, thereby enabling efficient shaving.

A razor assembly having a rotation function (hereinafter, a 'pivot razor assembly') may include a recovering force-providing unit to maintain good contact between the razor cartridge and the user's skin. The recovering force-providing unit may provide recovering force to the razor cartridge for restoring the rotated razor cartridge to a rest position.

On the other hand, to provide smooth shaving, it is significant for the pivot razor assembly to have an appropriate degree of rotation range and an appropriate magnitude of recovering force.

For example, the recovering force when provided too much from the recovering force-providing unit may cause stiff rotation of the razor cartridge. Conversely, the recovering force when provided too small from the recovering force-providing unit may disable the rotated razor cartridge from being quickly restored to the rest position and thereby deteriorate contactability between the razor cartridge and the user's skin.

Besides, when the rotation range of the razor cartridge is too large, the razor cartridge may rotate excessively and shaving may become inconvenient. Conversely, when the rotation range of the razor cartridge is too small, the razor cartridge may not rotate sufficiently when shaving a skin area with many curves, which makes the user's skin vulnerable to cuts and needs to be addressed.

SUMMARY

According to at least one embodiment, the present disclosure provides a razor assembly including a razor cartridge, a razor handle, and a recovering force-providing unit. The razor cartridge includes at least one shaving blade having a cutting edge and a blade housing configured to receive at least one shaving blade in a longitudinal direction. The razor handle is connected to the razor cartridge and configured to be rotatable about a first rotational axis parallel to the longitudinal direction within a predetermined rotation range. The recovering force-providing unit is configured to provide the razor cartridge having been rotated about the first rotational axis from a rest position with a recovering force for returning the razor cartridge to the rest position. Here, the predetermined rotation range includes a first pivot section spanning from the rest position to a first angle, and a second pivot section spanning from the first angle to a second angle greater than the first angle. The recovering force increases as the razor cartridge rotates with an increasing rotational angle, the recovering force increasing at an increasing rate that differs between the first pivot section and the second pivot section.

REFERENCE NUMERALS

Figure 1A:
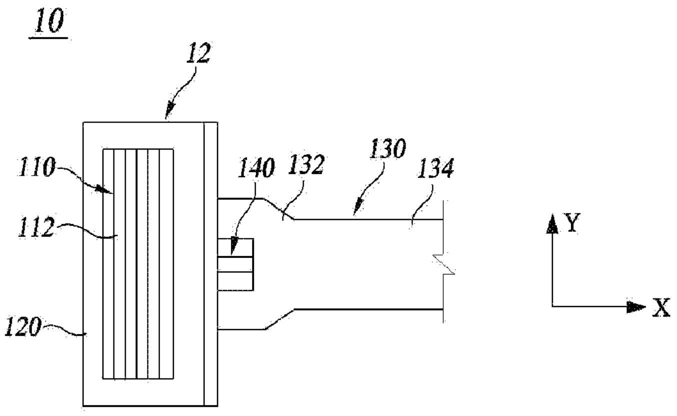
FIGS. 1A and 1B show a razor assembly according to at least one embodiment of the present disclosure.

| | |
|---|---|
| 10: razor assembly | 12: razor cartridge |
| 110: shaving blade | 120: blade housing |
| 130: razor handle | 140: recovering force-providing unit |
| 242: first elastic member | 243: second elastic member |
| 445: third elastic member | 546: fourth elastic member |
| 647: fifth elastic member | 760: function-providing unit |

DETAILED DESCRIPTION

The present disclosure in some embodiments seeks to provide a razor assembly with a razor cartridge capable of generating an appropriate recovering force while rotating within an appropriate rotation range thereof.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 1B:
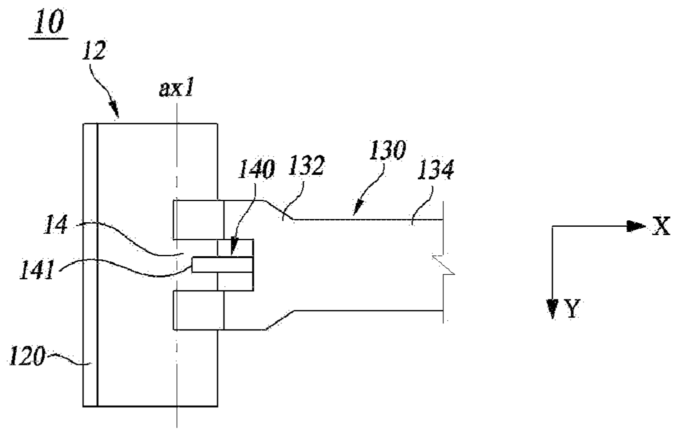

FIGS. 1A and 1B show a razor assembly 10 according to at least one embodiment of the present disclosure.

Specifically, FIG. 1A shows a front view of the razor assembly 10, and FIG. 1B shows a rear view of the razor assembly 10.

As shown in FIGS. 1A and 1B, the razor assembly 10 may include a razor cartridge 12, a razor handle 130, and a recovering force-providing unit 140.

The razor cartridge 12 may include at least one shaving blade 110 and a blade housing 120.

The blade housing 120 may constitute the outer contour of the razor cartridge 12 and accommodate at least one shaving blade 110 therein.

Specifically, the blade housing 120 may accommodate at least one shaving blade 110 to be placed in a longitudinal direction. Here, the longitudinal direction refers to a direction in which the blade housing 120 is elongated. For example, based on FIG. 1, the longitudinal direction is a direction parallel to the Y-axis and a lateral direction is a direction parallel to the X-axis.

Each shaving blade 110 may have a cutting edge 112 for cutting body hair.

The razor handle 130 may be connected to the razor cartridge 12. Specifically, the razor handle 130 may be connected to the razor cartridge 12 and be rotatable within a predetermined rotation range around a first rotational axis ax1 parallel to the longitudinal direction.

Optionally, the razor cartridge 12 may include a connector (not shown) for allowing the razor cartridge 12 to rotate relative to the razor handle 130.

The connector may be disposed on one side or the bottom side of the blade housing 120, and it may be configured to be rotatable with respect to the razor cartridge 12 or the razor handle 130.

For example, the connector may be fixed to the razor cartridge 12 and configured to be rotatable with respect to the razor handle 130, or it may be fixed to the razor handle 130 and configured to be rotatable with respect to the razor cartridge 12.

However, the present disclosure is not limited to these configurations, and the razor handle 130 may be configured to be directly connected to the razor cartridge 12 without a connector. For example, the razor cartridge 12 may be connected to be rotatable with respect to the razor handle 130 through a shell bearing method.

Here, the shell bearing method refers to a linkage established between a guided protrusion (not shown) formed on the razor handle 130 and a guide track (not shown) formed on the bottom side of the razor cartridge 12 so that the guided protrusion is inserted in and guided along the guide track for allowing the razor cartridge to be rotated relative to the razor handle.

The razor handle 130 may include a body portion 132 connected to the razor cartridge 12 and a grip portion 134 extending from the body portion 132.

The main body 132 may be connected to the razor cartridge 12 through the connector disposed on one side or the bottom side of the blade housing 120 or directly connected to the razor cartridge 12 without a connector.

The grip portion 134 may extend from the body portion 132. The grip portion 134 may provide an area for a user to grip the razor handle 130.

The body portion 132 may accommodate at least some of the recovering force-providing portion 140 therein. The recovering force-providing unit 140 may provide a recovering force to the razor cartridge 12 having been rotated from the rest position. Here, the recovering force refers to a force for restoring the razor cartridge 12 to the rest position.

The body portion 132 may be connected to the grip portion 134 to be rotatable about a second rotational axis (not shown) perpendicular to the first rotational axis ax1. However, the present disclosure is not limited to such a configuration. For example, the body portion 132 may be fixed in position with respect to the grip portion 134.

The grip portion 134 may be a separate member from the body portion 132, although it may be formed integrally with the body portion 132.

The recovering force-providing unit 140 may provide a recovering force to the razor cartridge 12 having been rotated about the first rotational axis ax1 from the rest position.

Specifically, the recovering force-providing unit 140 may have one side formed with a rear cam surface 141, and the razor cartridge 12 may have its rear surface formed with front cam surfaces 14 which are alternatively formed on a connecting member (not shown) of the razor handle 130 so that the rear cam surface 141 and the front cam surfaces 14 provide a cam action therebetween, which enables the recovering force-providing unit 140 to provide the recovering force to the razor cartridge 12.

To generate a recovering force, the recovering force-providing unit 140 may include at least one elastic material therein. For example, the recovering force-providing unit 140 may include, but not be limited to, a spring or a rubber band. Alternatively, the recovering force-providing unit 140 may include a magnetic material for generating a recovering force.

The recovering force-providing unit 140 according to some embodiments of the present disclosure features various arrangements of components configured to provide distinctive rotation characteristics according to the degree of rotation of the razor cartridge 12. A detailed description related thereto is described in connection with FIG. 2.

Figure 2:
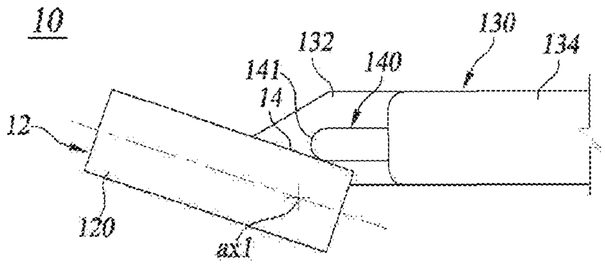
FIG. 2 illustrates a course of rotation of a razor cartridge with respect to a razor handle, according to at least one embodiment of the present disclosure.
Figure 2:
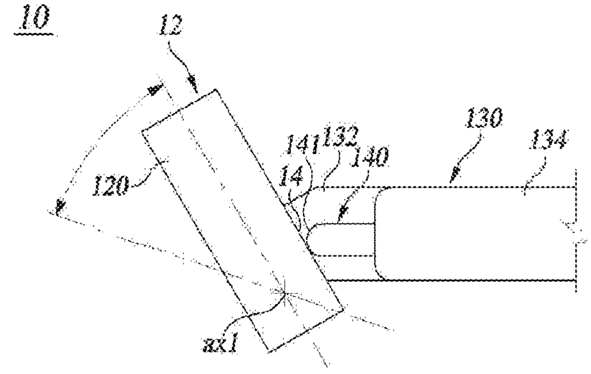
Figure 2:
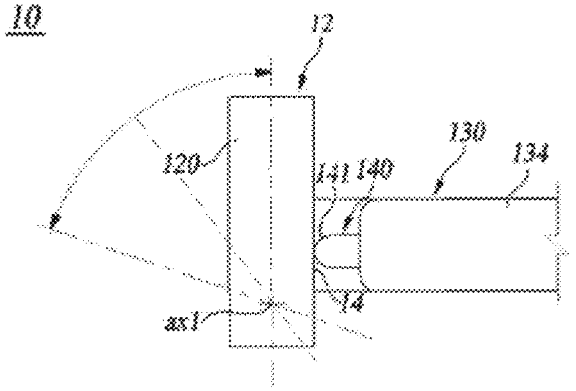

FIG. 2 illustrates a course of rotation of the razor cartridge 12 with respect to the razor handle 130, according to at least one embodiment of the present disclosure.

Specifically, FIG. 2 shows at (a) the razor cartridge 12 when in a rest position, FIG. 2 shows at (b) the razor cartridge 12 in a first pivot section, and FIG. 2 shows at (c) the razor cartridge 12 in a second pivot section.

As shown in FIG. 2 from (a) to (c), the razor cartridge 12 may pivot about a first rotational axis ax1 parallel to the longitudinal direction with respect to the razor handle 130 within a predetermined rotation range.

The rotation range of the razor cartridge 12 may include a first pivot section spanning from a rest position to a first angle and a second pivot section spanning from the first angle to a second angle greater than the first angle. Here, the angles of the razor cartridge 12, such as the first angle and the second angle, are values measured based on the rest position of the razor cartridge 12. For example, when the razor cartridge 12 is in the rest position, the angle of the razor cartridge 12 is 0 degrees.

The first angle may be 40 degrees to 60 degrees, and the second angle may be 90 degrees or less. However, the present disclosure is not limited to these particulars, and the first angle and the second angle may be set to values other than the above-described range according to the rotational property to be implemented.

The rotation range of the razor cartridge 12 according to at least one embodiment may have a relatively wide rotation range since it has the second pivot section further to the first pivot section. Accordingly, the razor cartridge 12 according to at least one embodiment can provide the user with a smooth shaving even when requiring a wide rotation range such as shaving a curvy skin area.

The razor assembly 10 according to at least one embodiment features distinctive rotation characteristics to be implemented between the first pivot section and the second pivot section through characteristic structuring or arrangement of components.

For example, the rate of increase of the recovering force according to the increase of the rotation angle of the razor cartridge 12 may differ between the first pivot section and the second pivot section.

More specifically, the rate of increase of the recovering force according to the increase of the rotation angle of the razor cartridge 12 may be greater in the second pivot section than in the first pivot section. This can provide the user with smoother shaving.

In this case, the razor assembly 10 may be provided with enough supporting force at the time of passing from the first pivot section to the second pivot section, when the increasing rate of the recovering force is given a boost. Therefore, the razor assembly 10 can keep on providing a smooth shaving to the user during normal shaving that does not require an excessive rotation angle.

Meanwhile, the razor assembly 10 according to at least one embodiment of the present disclosure optionally includes a function-providing unit which is illustrated further below.

The function-providing unit may be configured to provide a shaving function to the razor cartridge 12 only in the second pivot section.

The shaving function provided by the function-providing unit may include, but not be limited to, a heating function and a shaving aid jetting function. The present disclosure may have the function-providing unit configured to provide a shaving function other than the above-described functions.

To operate the function-providing unit during shaving, the user may rotate the razor cartridge 12 by an angle within the second pivot section which is a relatively large angle.

In other words, operating the function-providing unit needs the rotation of the razor cartridge 12 alone and no other operation, for example, a pressing operation of a button, a button sliding operation, and the like. Therefore, the razor assembly 10 according to at least one embodiment of the present disclosure allows a user to easily operate the function-providing unit while even in shaving.

The second to fifth embodiments of the present disclosure illustrated in FIGS. 3 to 20 to follow will be described with respect to exemplary configurations of a recovering force-providing unit. Specifically, in each embodiment, a plurality of elastic members accommodated in the razor handle is disposed in various ways, which allows the recovering force-providing unit to implement different rotation characteristics between the first pivot section and the second pivot section. The following elaborates on the differentiated features according to the second to fifth embodiments of the present disclosure, omitting a repetitive description of the configuration substantially the same as that of at least one embodiment.

Figure 3:
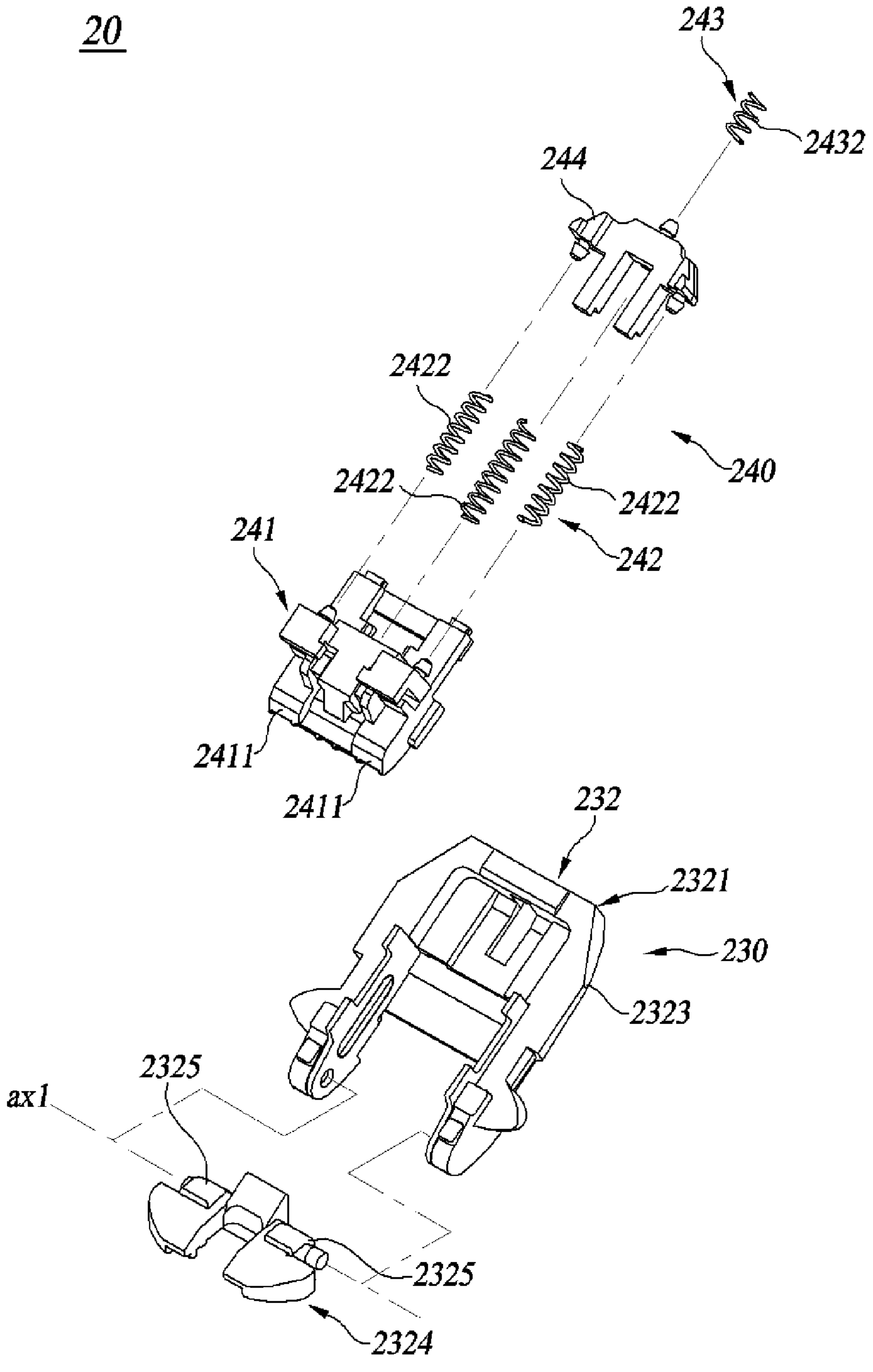
FIG. 3 is an exploded perspective view of a razor handle and a recovering force-providing unit according to a second embodiment of the present disclosure.

FIG. 3 is an exploded perspective view of a razor handle 230 and a recovering force-providing unit 240 according to the second embodiment of the present disclosure.

As shown in FIG. 3, the razor handle 230 may have a body portion 232 including a body housing 2321 and a connecting member 2324, while the recovering force-providing unit 240 may have a plunger 241, a first elastic member 242, a second elastic member 243, and a plunger guide 244.

The body housing 2321 may include an upper segment (not shown) and a lower segment 2323. Between the upper segment and the lower segment 2323 is an area that may define a receiving space of the body housing 2321. The recovering force-providing unit 240 may be accommodated in the receiving space of the body housing 2321.

The upper section and the lower section 2323 may be configured to be assembled, but the present disclosure is not so limited. For example, the upper segment and the lower segment 2323 may be formed integrally.

The connection member 2324 may interconnect a razor-cartridge connector (not shown) and the body housing 2321 of the razor handle 230.

Specifically, the connecting member 2324 may have one side adjacent to a razor cartridge (not shown) and connected with the razor cartridge at its connector. Additionally, the connecting member 2324 may have the other side spaced apart from the razor cartridge and connected with the body housing 2321 of the body portion 232 to be rotatable about the first rotation shaft ax1.

On the bottom side of the razor cartridge or on the other side of the connecting member 2324, first cam surfaces 2325 may be formed. The first cam surfaces 2325 may provide a cam action with second cam surfaces 2411 formed on one side of the plunger 241.

Through the cam action between the first cam surfaces 2325 and the second cam surfaces 2411, the rotational motion of the razor cartridge can be converted into a linear motion of the plunger 241, while the linear motion of the plunger 241 can be converted into a rotational motion of the razor cartridge.

Additionally, through the cam action between the first cam surfaces 2325 and the second cam surfaces 2411, the recovering force generated from the recovering force-providing unit 240 may be transmitted to the razor cartridge.

On the other hand, although FIG. 3 illustrates that the connection member 2324 is to be connected to the razor-cartridge connector thereby interconnecting the razor cartridge and the razor handle 230, the present disclosure is not so limited.

For example, without the connection member 2324, the body housing 2321 of the body portion 232 may be coupled to the razor-cartridge connector, or, the body housing 2321 may also be connected with the razor cartridge directly without a razor-cartridge connector. In this case, the first cam surface 2325 may be alternatively formed on the bottom side of the razor cartridge.

The plunger 241 may transmit the recovering force generated from the first elastic member 242 and the second elastic member 243 to the razor cartridge.

The plunger 241 may be disposed adjacent to the razor cartridge. The second cam surfaces 2411 may be formed on the plunger 241 at the one side adjacent to the razor cartridge. The second cam surfaces 2411 may be in camming contact with the first cam surfaces 2325 formed on the bottom side of the razor cartridge or the other side of the connecting member 2324.

The plunger 241 may linearly move forward or backward through a cam action between the first cam surfaces 2325 and the second cam surfaces 2411. The plunger 241 may compress, through linear motion, the first elastic member 242 and the second elastic member 243. Meanwhile, in the description related to FIG. 3, the forward refers to a direction approaching the first rotation shaft ax1, and the backward refers to a direction away from the first rotation shaft ax1.

The first elastic member 242 may be elastically deformed by being compressed by the plunger 241, through which it may generate a recovering force.

The first elastic member 242 may have one side adjacent to the razor cartridge and connected to the other side of the plunger 241. The first elastic member 242 may have the other side spaced apart from the razor cartridge and connected to the plunger guide 244 at its one side adjacent to the razor cartridge.

The first elastic member 242 may be compressed by the plunger 241 linearly moving backward. In this case, an elastic force may be generated inside the first elastic member 242 due to elastic deformation. The elastic force of the first elastic member 242 may function as a recovering force for restoring the razor cartridge to a rest position.

The first elastic member 242 may include, but not be limited to, springs 2422. Accordingly, the first elastic member 242 may include an elastic body other than a spring, for example, a rubber member (not shown).

The first elastic member 242 may include a plurality of springs 2422 disposed in parallel. For example, the first elastic member 242 may include three springs 2422 connected to the other side of the plunger 241.

However, the present disclosure is not limited to this configuration. For example, the first elastic member 242 may include one spring or a plurality of springs arranged in series.

The plunger guide 244 may be disposed between and interconnect the first elastic member 242 and the second elastic member 243.

The plunger guide 244 may have one side adjacent to the razor cartridge and connected to the other side of the first elastic member 242. Further, the plunger guide 244 may have the other side spaced apart from the razor cartridge and connected to the second elastic member 243 at its one side adjacent to the razor cartridge.

When compressed by the linear motion of the plunger 241, the first elastic member 242 may press the plunger guide 244 backward. The plunger guide 244 pressed by the first elastic member 242 may linearly move backward. In this case, the plunger guide 244 may compress the second elastic member 243 through linear motion.

The second elastic member 243 may be elastically deformed by being compressed by the plunger guide 244, through which it may generate a recovering force.

The second elastic member 243 may have one side adjacent to the razor cartridge and connected to the other side of the plunger guide 244. Additionally, the second elastic member 243 may have the other side spaced apart from the razor cartridge and connected to the body housing 2321 at its one side spaced apart from the razor cartridge.

Since the one side of the body housing 2321 is fixed in position with respect to the first rotational axis ax1, the position of the other side of the second elastic member 243 may also be fixed with respect to the first rotational axis ax1.

With the other side of the second elastic member 243 fixed in position, the second elastic member 243 can be compressed by the plunger guide 244 linearly moving backward. In this case, an elastic force may be generated inside the second elastic member 243 by elastic deformation. The elastic force of the second elastic member 243 may function as a recovering force for restoring the razor cartridge to the rest position.

The second elastic member 243 may include, but not be limited to, a spring 2432. Accordingly, the second elastic member 243 may include an elastic body other than a spring, for example, a rubber member (not shown).

The second elastic member 243 may include one spring 2432. For example, the first elastic member 242 may include one spring 2432 disposed centrally of the other side of the plunger guide 244.

However, the present disclosure is not limited to this configuration. For example, the second elastic member 243 may include a plurality of springs arranged in series or in parallel.

Meanwhile, the first elastic member 242 and the second elastic member 243 may be arranged in series. Here, being arranged in series means that the first elastic members 242 and the second elastic members 243 are arranged in a row substantially.

In such a serial arrangement, the first elastic member 242 may be disposed forwardly of the second elastic member 243, although the present disclosure is not so limited. For example, the first elastic member 242 may be disposed rearwardly of the second elastic member 243.

The razor assembly 20 according to the second embodiment of the present disclosure features implementing two pivot sections having different rotation characteristics by arranging the first elastic member 242 and the second elastic member 243 in series. A detailed description related thereto will be provided with reference to FIGS. 4 to 6.

Figure 4:
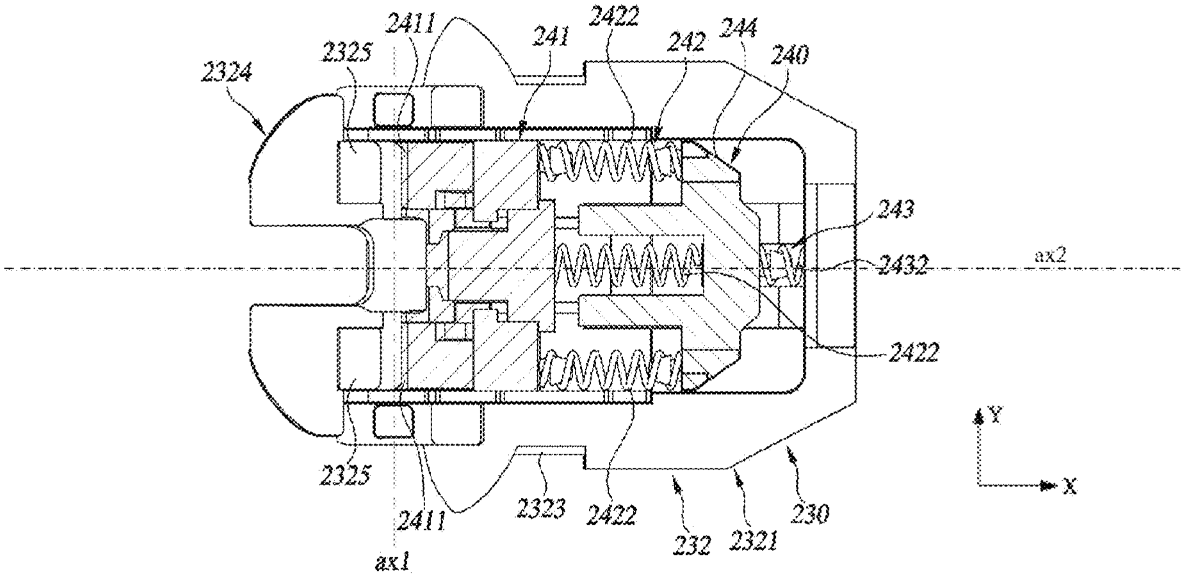
FIG. 4 illustrates the razor handle and the recovering force-providing unit combined for providing a razor cartridge with a rest position to take according to the second embodiment of the present disclosure.

FIG. 4 illustrates the razor handle 230 and the recovering force-providing unit 240 combined for providing a razor cartridge (not shown) with a rest position to take according to the second embodiment of the present disclosure.

Figure 5:
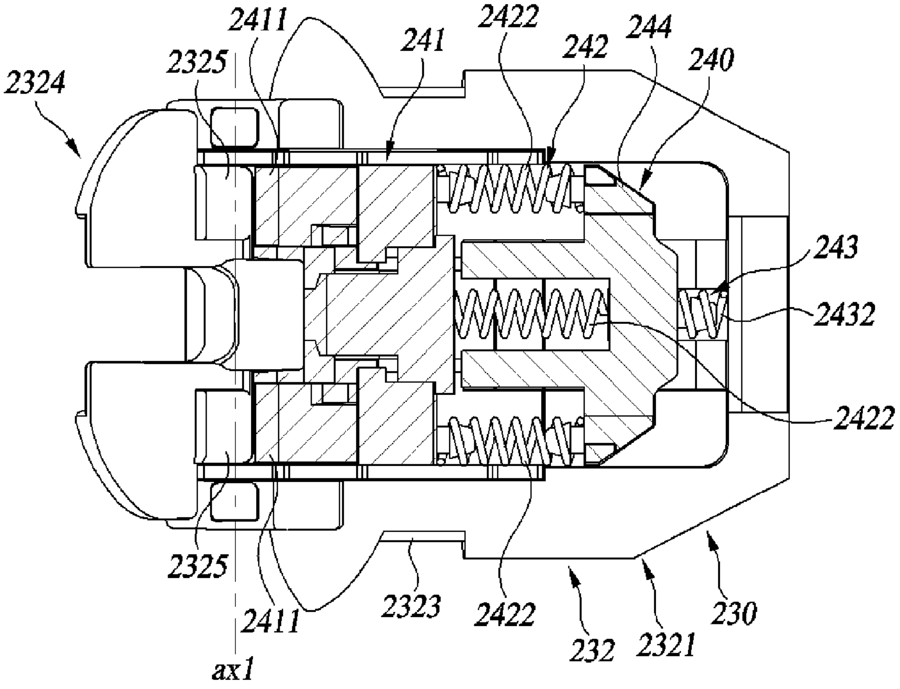
FIG. 5 illustrates the razor handle and the recovering force-providing unit positioning the razor cartridge in a first pivot section according to the second embodiment of the present disclosure.

FIG. 5 illustrates the razor handle 230 and the recovering force-providing unit 240 positioning the razor cartridge in a first pivot section according to the second embodiment of the present disclosure.

Figure 6:
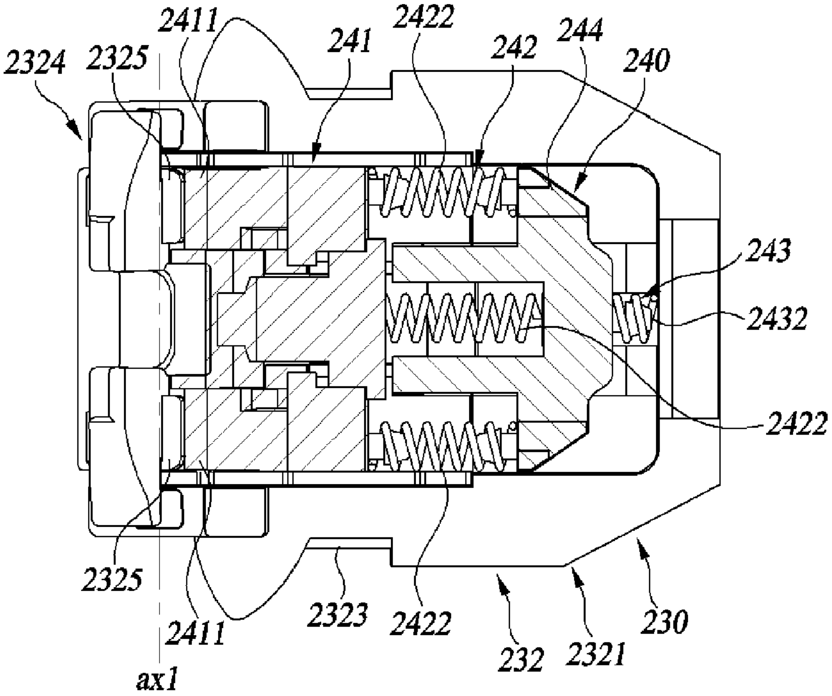
FIG. 6 illustrates the razor handle and the recovering force-providing unit positioning the razor cartridge in a second pivot section according to the second embodiment of the present disclosure.

FIG. 6 illustrates the razor handle 230 and the recovering force-providing unit 240 positioning the razor cartridge in a second pivot section according to the second embodiment of the present disclosure.

As illustrated in FIGS. 4 to 6, the razor cartridge (not shown) may be enabled to rotate about the first rotational axis ax1 parallel to the longitudinal direction with respect to the razor handle 230 within a predetermined rotation range.

The rotation range may include a first pivot section spanning from the rest position to the first angle and a second pivot section spanning from the first angle to a second angle greater than the first angle. Here, the angles of the razor cartridge, such as the first angle and the second angle, are values measured based on the rest position of the razor cartridge. For example, when the razor cartridge is in the rest position, the angle of the razor cartridge is 0 degrees.

The first angle may be 40 degrees to 60 degrees, and the second angle may be 90 degrees or less. However, the present disclosure is not limited to these particulars, and the first angle and the second angle may be set to values other than the above-described range according to the rotational property to be implemented.

As shown in FIG. 4, when the razor cartridge is in a rest position, the first elastic member 242 and the second elastic member 243 might have been already preloaded. In other words, the first elastic member 242 and the second elastic member 243 might have been already compressed by a predetermined amount along a lateral axis ax2 before the razor cartridge rotates.

The recovering force-providing unit 240 may utilize this initial compression state of the first elastic member 242 and the second elastic member 243 to provide an initial recovering force to the razor cartridge in the rest position. The razor cartridge may be stopped from being rotated to remain in the rest position until it takes a force equal to or greater than the initial recovering force acting thereon.

This can prevent the razor cartridge from undesirably rotating when the user is shaving with a relatively small force for the purpose of reducing skin irritation.

However, the present disclosure is not limited to this configuration, and when the razor cartridge is in a rest position, only one of the first elastic member 242 and the second elastic member 243 is preloaded, or both the first elastic member 242 and the second elastic member 243 may not be preloaded.

As illustrated in FIG. 5, when the unshown razor cartridge is rotated from the rest position to an angle within the first pivot section, the plunger 241 may be moved backward due to camming between the first cam surfaces 2325 and the second cam surfaces 2411.

The first elastic member 242 may be compressed by the plunger 241 moving rearwardly. When compressed by the movement of the plunger 241, the first elastic member 242 may urge the plunger guide 244 backward. The plunger guide 244 urged by the first elastic member 242 may move backward. In this case, the plunger guide 244 as moving backward may compress the second elastic member 243.

When the razor cartridge is rotating within the first pivot section, the first elastic member 242 and the second elastic member 243 may be compressed more than the preloaded state, respectively. In this case, the recovering force-providing unit 240 may provide a recovering force greater than the initial recovering force to the razor cartridge.

When the razor cartridge is rotating within the first pivot section, the first elastic member 242 and the second elastic member 243 are yet to reach a compression limit, they are compressed in proportion as the razor cartridge rotates further. Here, the compression limit refers to a point at which the elastic member is no longer compressed due to physical limitations by the structure and physical properties of the elastic member.

The more deformation, for example, compression made to the elastic body, the greater the magnitude of the elastic force generated from the elastic body. Accordingly, the recovering force respectively generated by the first elastic member 242 and the second elastic member 243 may increase as the rotation angle of the razor cartridge increases in the first pivot section.

As shown in FIG. 6, when the razor cartridge is rotated from the first pivot section to an angle within the second pivot section, the plunger 241 may be moved backward due to camming between the first cam surfaces 2325 and the second cam surfaces 2411. In this case, the plunger 241 may move more rearward than when the razor cartridge rotates within the first pivot section.

Meanwhile, within the second pivot section, the first elastic member 242 may be in a state that has reached the compression limit. In other words, within the second pivot section, the first elastic member 242 may be in a state exhibiting substantially no more compression. The first elastic member 242 may have a compression limit at a first angle that is a boundary angle between the first pivot section and the second pivot section.

Accordingly, when the plunger 241 moves backward, the first elastic member 242 may move backward without compression. The first elastic member 242 may pressurize to move backward. When the plunger guide 244 moves backward, the first elastic member 242 may move the plunger guide 244 rearwardly. In this case, the plunger guide 244 as moving backward may compress the second elastic member 243.

When the razor cartridge is rotating within the second pivot section, compression is no longer performed in the first elastic member 242 that has reached the compression limit, while the second elastic member 243 Can be compressed over and over again.

The more deformation, for example, compression made to the elastic body, the greater the magnitude of the elastic force generated from the elastic body. Accordingly, the recovering force generated by the second elastic member 243 may increase as the rotation angle of the razor cartridge increases in the second pivot section.

However, in the second pivot section, since no compression is made in the first elastic member 242, the increase in recovering force due to an increase in the rotation angle of the razor cartridge in the second pivot section can be achieved only by increasing the degree of compression of the elastic member 243.

Meanwhile, an increasing rate of the recovering force according to an increase in the rotation angle of the razor cartridge may be distinctive between the first pivot section and the second pivot section. For example, an increasing rate of the recovering force according to an increase in the rotation angle of the razor cartridge may be greater in the second pivot section than in the first pivot section. A detailed description related thereto is presented in connection with FIG. 7.

Figure 7:
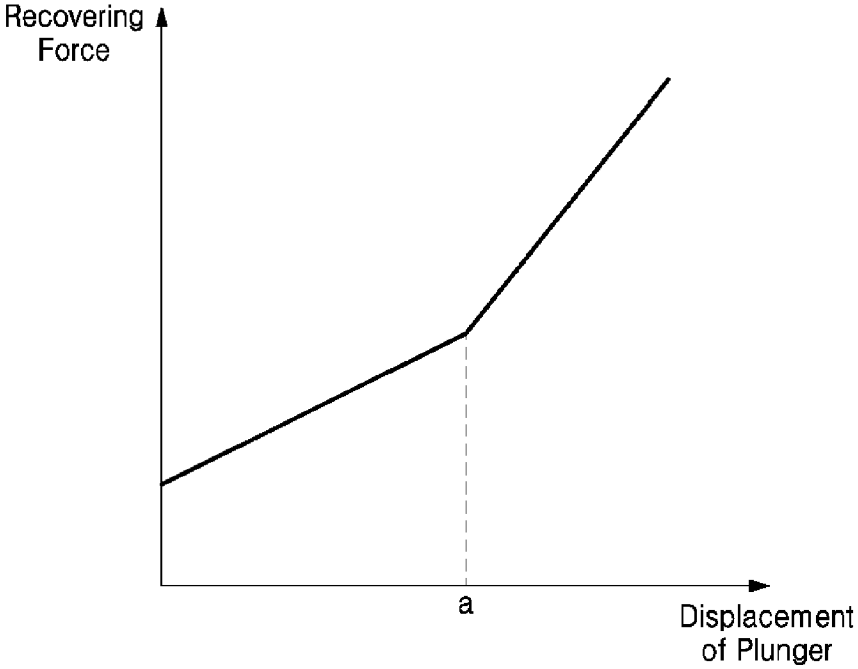
FIG. 7 is a graph showing the magnitude of recovering force according to the displacement of a plunger of a razor assembly according to the second embodiment of the present disclosure.

FIG. 7 is a graph showing the magnitude of the recovering force according to the displacement or displacement of the plunger 241 of the razor assembly 20 according to the second embodiment of the present disclosure.

In FIG. 7, the moving distance or displacement of the plunger 241 refers to the distance traveled by the plunger 241 as the razor cartridge rotates based on the position of the plunger 241 at which the razor cartridge takes a rest position.

As illustrated in FIG. 7, when the razor cartridge is in the rest position, the displacement of the plunger 241 is zero. However, since the first elastic member 242 and the second elastic member 243 are in a preloaded state, the recovering force-providing unit 240 may provide an initial recovering force to the razor cartridge.

When the razor cartridge rotates within the first pivot section, as the rotation angle of the razor cartridge increases, the displacement of the plunger 241 may increase. Specifically, the plunger 241 may move to a first distance 'a' from a first angle which is a boundary angle between the first pivot section and the second pivot section.

In the first pivot section, since both the first elastic member 242 and the second elastic member 243 are yet to reach the compression limit, as the rotation angle of the razor cartridge increases, the first elastic member 242 and the second elastic member 243 may be compressed more.

On the other hand, assuming that the first elastic member 242 includes three first springs 2422 and the second elastic member 243 includes one second spring 2432, since the first elastic member 242 and the second elastic member 243 are arranged in series, the spring constant of the entire spring system composed of the first elastic member 242 and the second elastic member 243 may satisfy, in the first pivot section, Equation 1 below.

$$K1=3KA,$$

$$K2=KB,$$

$$KT1=(K1\times K2)/(K1+K2)=(3KA\times KB)/(3KA+KB) \quad \text{Equation 1}$$

Here, K1 denotes the spring constant of the first elastic member, KA the spring constant of the first spring, K2 the spring constant of the second elastic member, KB the spring constant of the second spring, and KT1 the spring constant of the entire spring system in the first pivot section.

As can be seen in Equation 1, since both K1 and K2 are positive numbers, K1/(K1+K2) and K2/(K1+K2) are bound to be less than 1. Therefore, KT1 is bound to have a smaller value than K1 and K2. This result is due to the property that when two springs are arranged in series, the spring constant of the entire spring system becomes smaller than the smaller of the spring constants of the two springs.

Since the magnitude of the recovering force corresponds to the magnitude of the elastic force generated from the first and second elastic members 242 and 243, in the first pivot section, the slope of the recovering force according to the displacement of the plunger 241 is proportional to KT1.

When the razor cartridge rotates within the second pivot section, as the rotation angle of the razor cartridge increases, the displacement of the plunger 241 may increase.

In the second pivot section, when the razor cartridge is rotating, the first elastic member 242 that has reached the compression limit exhibits no further compression, whereas the second elastic member 243 may continue to be compressed.

Therefore, in the second pivot section, unlike in the first pivot section, the first elastic member 242 and the second elastic member 243 no longer behave as if two springs are arranged in series. In other words, entering the second pivot section, the entire spring system may be reduced to the second elastic member 243 alone. In this case, the spring constant of the entire spring system in the second pivot section may satisfy Equation 2 below.

$$KT2=K2 \quad \text{Equation 2}$$

Here, KT2 denotes the spring constant of the entire spring system in the second pivot section.

As described above, since K1/(K1+K2) has a value less than 1, KT2 is bound to have a value greater than KT1.

Since the magnitude of the recovering force corresponds to the magnitude of the elastic force generated from the first elastic member 242 and the second elastic member 243, in the second pivot section, the slope of the recovering force according to the displacement of the plunger 241 is proportional to KT2.

Since KT2 has a larger value than KT1, the slope of the recovering force in the second pivot section may be steeper than the slope of the recovering force in the first pivot section. In other words, the rate of increase of the recovering force according to the increase in the rotation angle of the razor cartridge may be greater in the second pivot section than in the first pivot section.

Meanwhile, referring to Equation 2, the rate of increase of the recovering force in the second pivot section may be determined entirely by the spring constant of the second spring 2432 of the second elastic member 243. Accordingly, to boost the rate of increase of the recovering force in the second pivot section, the spring constant of the second spring 2432 may be designed to be greater than that of the first springs 2422.

However, the present disclosure is not limited to this configuration, and the spring constant of the second spring 2432 may be made smaller than or the same as that of the first springs 2422.

Figure 8:
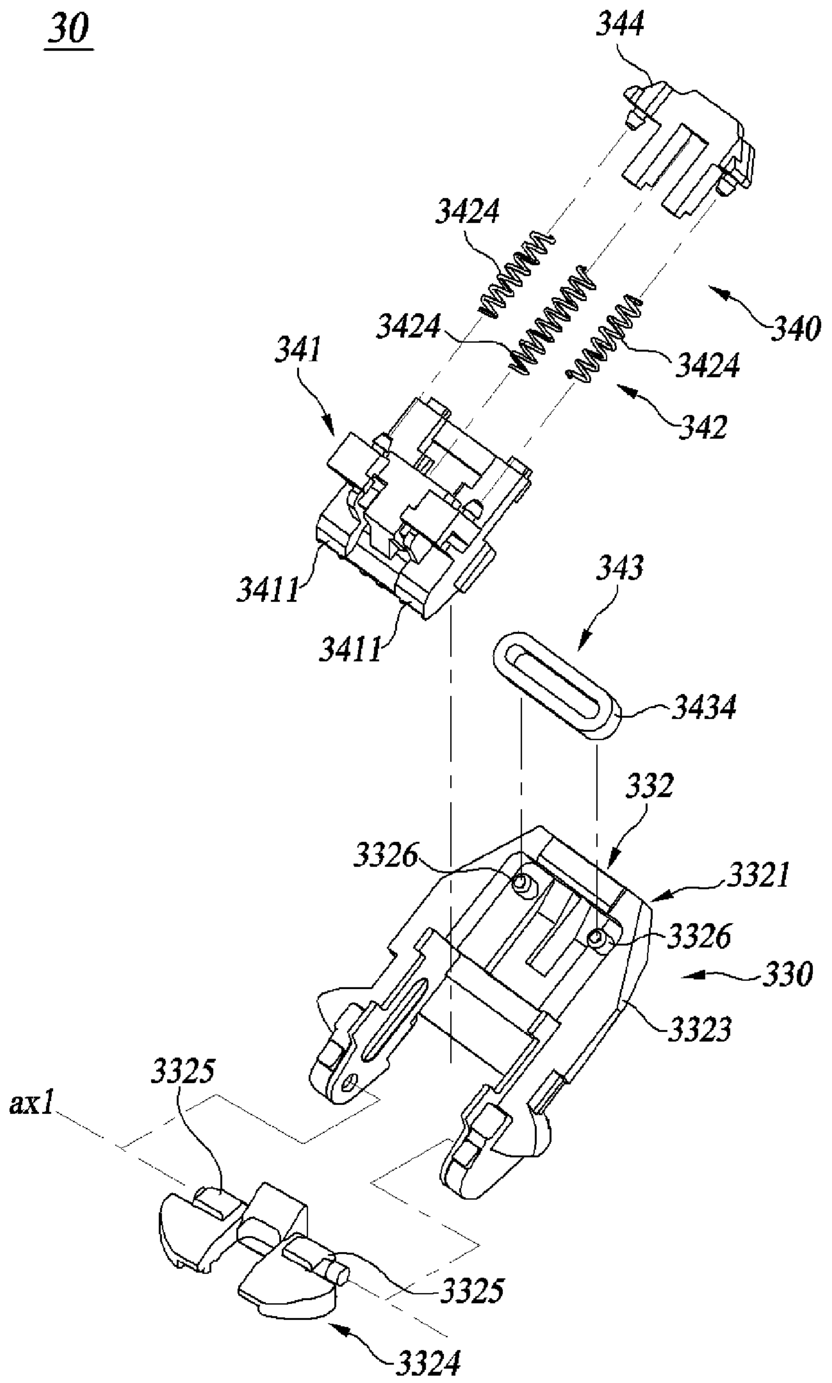
FIG. 8 is an exploded perspective view of a razor handle and a recovering force-providing unit according to a third embodiment of the present disclosure.

FIG. 8 is an exploded perspective view of a razor handle 330 and a recovering force-providing unit 340 according to the third embodiment of the present disclosure.

As shown in FIG. 8, the recovering force-providing unit 340 may include a plunger 341, a first elastic member 342, a second elastic member 343, and a plunger guide 344.

The second elastic member 343 according to the third embodiment of the present disclosure includes an elastic body, for example, a rubber band 3434. However, the present disclosure is not so limited, and the second elastic member 3434 may include an elastic body other than the rubber band 3434, such as a rubber block (not shown) and a sponge (not shown).

The razor handle 330 may have a body portion 332 including a body housing 3321, a lower segment 3323 of which includes a pair of fixing protrusions 3326 protruding from one side of the lower segment 3323. The pair of locking protrusions 3326 may be spaced apart in the longitudinal direction.

Both sides of the rubber band 3434 may be caught by the two locking protrusions 3326, respectively. This allows the rubber band 3434 to be fixed to the body housing 3321.

The plunger 341 may linearly move forward or backward through camming between first cam surfaces 3325 and second cam surfaces 3411. The plunger 341 may move linearly and thereby compress and tension the first elastic member 342 and the rubber band 3434 of the second elastic member 343, respectively.

The first elastic member 342 may be compressed by the plunger 341 linearly moving backward. In this case, an elastic force may be generated inside the first elastic member 342 due to elastic deformation. The elastic force of the first elastic member 342 may function as a recovering force for restoring the razor cartridge (not shown) to a rest position.

The first elastic member 342 may include, but not be limited to, springs 3424. Accordingly, the first elastic member 342 may include an elastic material other than a spring, for example, a rubber member (not shown).

The plunger guide 344 may be disposed between the first elastic member 342 and the second elastic member 343 and may interconnect the two members.

When compressed by the linear motion of the plunger 341, the first elastic member 342 may urge the plunger guide 344 backward. The plunger guide 344 urged by the first elastic member 342 may linearly move backward.

In this case, the plunger guide 344 may move linearly to depress the second elastic member 343. Specifically, the plunger guide 344 may tension the rubber band 3434 by depressing the same.

The rubber band 3434 may be elastically deformed under tension by the plunger guide 344, thereby generating a recovering force.

Figure 9:
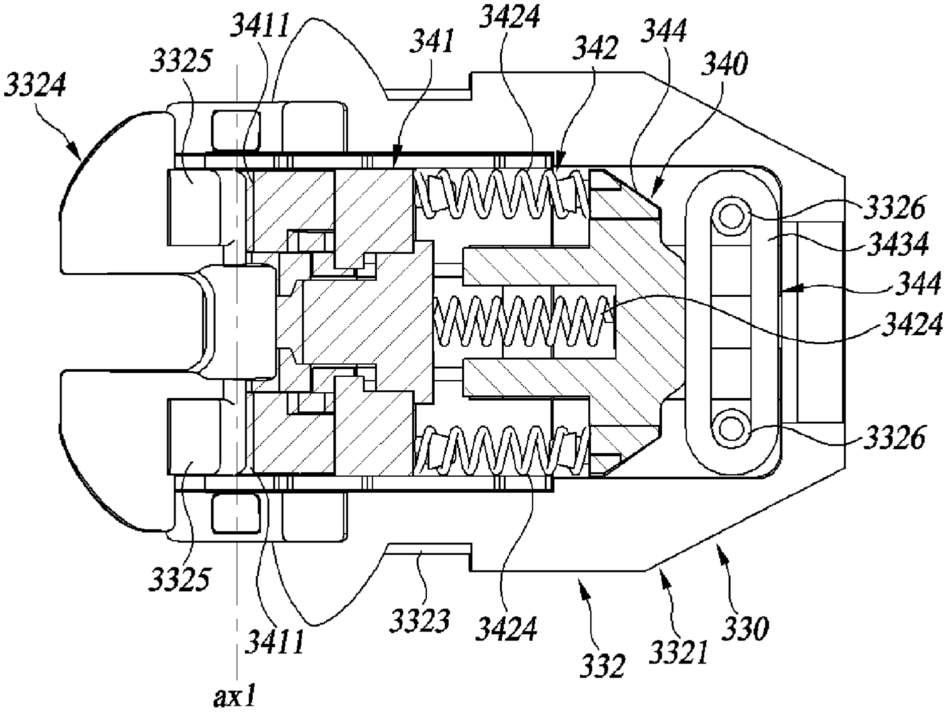
FIG. 9 illustrates the razor handle and the recovering force-providing unit combined for providing a razor cartridge with a rest position to take according to the third embodiment of the present disclosure.

FIG. 9 illustrates the razor handle 330 and the recovering force-providing unit 340 combined for providing a razor cartridge (not shown) with a rest position to take according to the third embodiment of the present disclosure.

Figure 10:
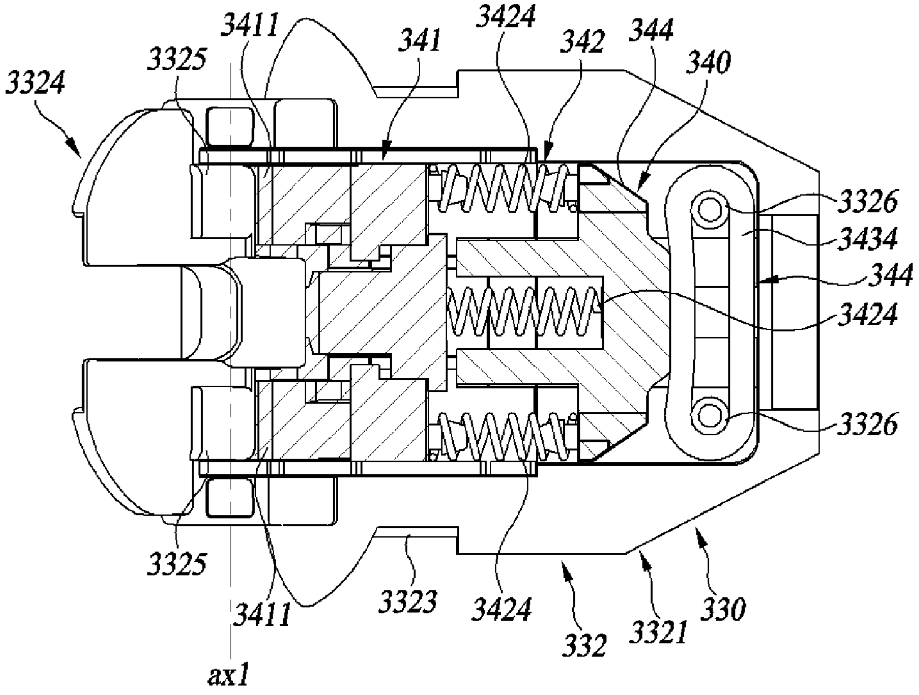
FIG. 10 illustrates the razor handle and the recovering force-providing unit positioning the razor cartridge in a first pivot section according to the third embodiment of the present disclosure.

FIG. 10 illustrates the razor handle 330 and the recovering force-providing unit 340 positioning the razor cartridge in a first pivot section according to the third embodiment of the present disclosure.

Figure 11:
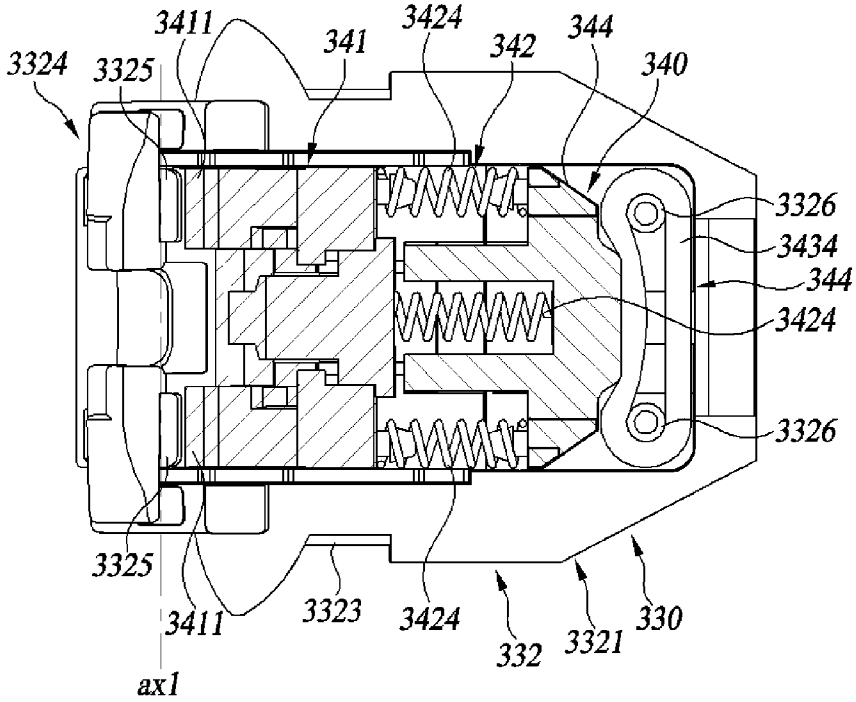
FIG. 11 illustrates the razor handle and the recovering force-providing unit positioning the razor cartridge in a second pivot section according to the third embodiment of the present disclosure.

FIG. 11 illustrates the razor handle 330 and the recovering force-providing unit 340 positioning the razor cartridge in a second pivot section according to the third embodiment of the present disclosure.

As illustrated in FIGS. 9 to 11, the razor cartridge (not shown) may be enabled to rotate with respect to the razor handle 330 within a predetermined rotation range around the first rotational axis ax1 parallel to the longitudinal direction.

The rotation range may include a first pivot section spanning from the rest position to the first angle and a second pivot section spanning from the first angle to a second angle greater than the first angle. Here, the angles of the razor cartridge, such as the first angle and the second angle, are values measured based on the rest position of the razor cartridge. For example, when the razor cartridge is in the rest position, the angle of the razor cartridge is 0 degrees.

As illustrated in FIGS. 9 and 10, when the razor cartridge is rotated from the rest position to the angle within the first pivot section, the plunger 341 may move backward by camming between the first cam surfaces 3325 and the second cam surfaces 3411.

The first elastic member 342 may be compressed by the plunger 341 moving backward. In this case, the plunger guide 344 as moving backward may tension the rubber band 3434 of the second elastic member 343.

When the razor cartridge is rotating within the first pivot section, since the first elastic member 342 and the second elastic member 343 are yet to reach the compression limit and the tensile limit, they may be deformed even more as the razor cartridge rotates further. Accordingly, the recovering force respectively generated by the first elastic member 342 and the second elastic member 343 may increase as the rotation angle of the razor cartridge increases in the first pivot section. Here, the tensile limit refers to a point at which the elastic members are no longer stretched due to physical limitations subject to their structure and physical properties.

As shown in FIGS. 10 and 11, when the razor cartridge is rotated from the first pivot section to an angle within the second pivot section, the plunger 341 may move further backward by camming between the first cam surfaces 3325 and the second cam surfaces 3411.

Meanwhile, within the second pivot section, the first elastic member 342 may have reached the compression limit. In other words, within the second pivot section, the first elastic member 342 may be exhibiting substantially no compression. The first elastic member 342 may have the compression limit at a first angle that is a boundary angle between the first pivot section and the second pivot section.

Accordingly, when the plunger 341 moves backward, the first elastic member 342 may move backward without compression. In response to the first elastic member 342 moving backward, the plunger guide 344 may move backward, which may tension the rubber band 3434 of the second elastic member 343.

When the razor cartridge is rotating within the second pivot section, compression is no longer performed in the first elastic member 342 that has reached the compression limit, while the rubber band 3434 of the second elastic member 343 may continue to be stretched.

In the second pivot section, since no compression occurs in the first elastic member 342, the increase in the resilience force according to the increase of the rotation angle of the razor cartridge in the second pivot section may be achieved substantially only by increasing the degree of tension of the rubber band 3434 of the second elastic member 343.

Meanwhile, an increasing rate of the recovering force according to an increase in the rotation angle of the razor cartridge may be distinctive between the first pivot section and the second pivot section. For example, an increasing rate of the recovering force according to an increase in the rotation angle of the razor cartridge may be greater in the second pivot section than in the first pivot section.

Figure 12:
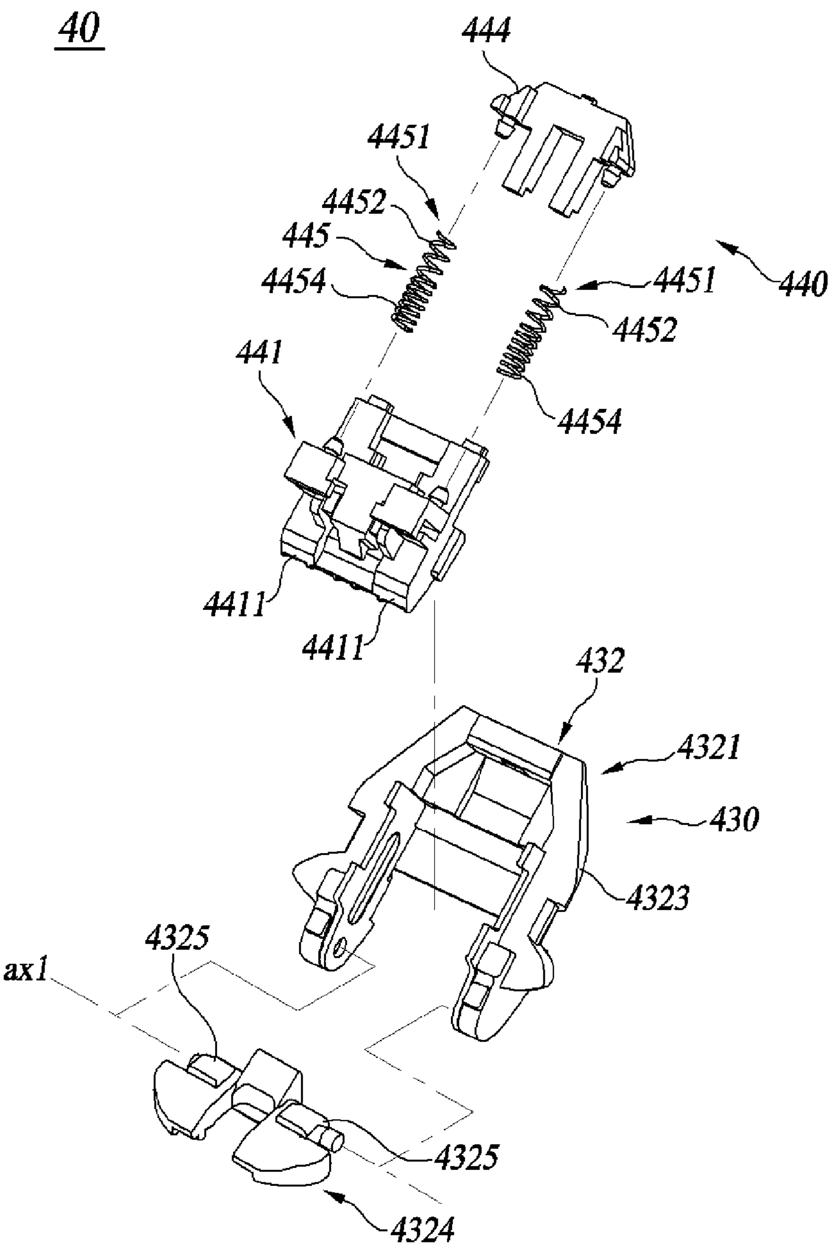
FIG. 12 is an exploded perspective view of a razor handle and a recovering force-providing unit according to a fourth embodiment of the present disclosure.

FIG. 12 is an exploded perspective view of a razor handle 430 and a recovering force-providing unit 440 according to the fourth embodiment of the present disclosure.

As shown in FIG. 12, the razor handle 430 may have a body portion 432 including a body housing 4321 and a connection member 4324, while the recovering force-providing portion 440 may include a plunger 441 and a third elastic member 445.

The third elastic member 445 may include a first elastic area 4452 and a second elastic area 4454 having different elastic properties from each other. The first elastic area 4452 and the second elastic area 4454 may be interconnected and may be formed integrally.

Assuming that the third elastic member 445 includes springs 4451 each having an even thickness, each spring 4451 may be divided into the first elastic area 4452 and the second elastic area 4454 by varying the winding density within the single spring 4451. For example, the winding density of the first elastic area 4452 may be smaller than that of the second elastic area 4454.

Assuming that the two elastic areas 4452 and 4454 have the same length, since the area with low winding density has a larger spring constant than the area with high winding density, the spring constant of the first elastic area 4452 may have a larger value than the spring constant of the second elastic area 4454.

Meanwhile, the first elastic area 4452 and the second elastic area 4454 may be arranged in series. In such a serial arrangement, the first elastic area 4452 may be disposed behind the second elastic area 4454, although the present disclosure is not so limited. For example, the first elastic area 4452 may be disposed in front of the second elastic area 4454.

The razor assembly 40 according to the fourth embodiment of the present disclosure features an arrangement of the first elastic area 4452 and the second elastic area 4454 having different elastic properties in series in each elastic member 445, thereby implementing two pivot sections having distinctive rotation characteristics. A detailed description related thereto will be described in detail referring to FIGS. 13 to 15.

Referring back to FIG. 12, the third elastic member 445 may include a plurality of springs 4451 disposed in parallel. For example, the third elastic member 445 may include two springs 4451 connected to the other side of the plunger 441.

However, the present disclosure is not limited to this configuration. For example, the third elastic member 445 may include one spring or may include a plurality of springs arranged in series.

The third elastic member 445 may have one side adjacent to a razor cartridge (not shown) and connected to the other side of the plunger 441. The third elastic member 445 may have the other side spaced apart from the razor cartridge and connected to a plunger guide 444 at its one side adjacent to the razor cartridge or connected to one side of the body housing 4321.

When the recovering force-providing unit 440 includes the plunger guide 444, the other side of the plunger guide 444 spaced apart from the razor cartridge may be supported by the one side of the body housing 4321. This means that the plunger guide 444 may be fixed in position.

First cam surfaces 4325 may be formed on the bottom side of the unshown razor cartridge or the other side of the connection member 4324. The first cam surfaces 4325 may provide camming with second cam surfaces 4411 formed on one side of the plunger 441.

Through camming between the first cam surfaces 4325 and the second cam surfaces 4411, the rotational motion of the razor cartridge may be converted into a linear motion of the plunger 441, and the linear motion of the plunger 441 may be converted into a rotational motion of the razor cartridge.

Additionally, through the camming between the first cam surfaces 4325 and the second cam surfaces 4411, the recovering force generated from the recovering force-providing unit 440 may be transmitted to the razor cartridge.

The plunger 441 may transmit a recovering force generated from the first elastic areas 4452 and the second elastic areas 4454 of the third elastic member 445 to the razor cartridge.

The plunger 441 may linearly move forward or backward through camming between the first cam surfaces 4325 and the second cam surfaces 4411. The plunger 441 may compress, through its linear motion, the first elastic areas 4452 and the second elastic areas 4454.

The first elastic areas 4452 and the second elastic areas 4454 may be elastically deformed by being compressed by the plunger 441, thereby generating the recovering force.

Figure 13:
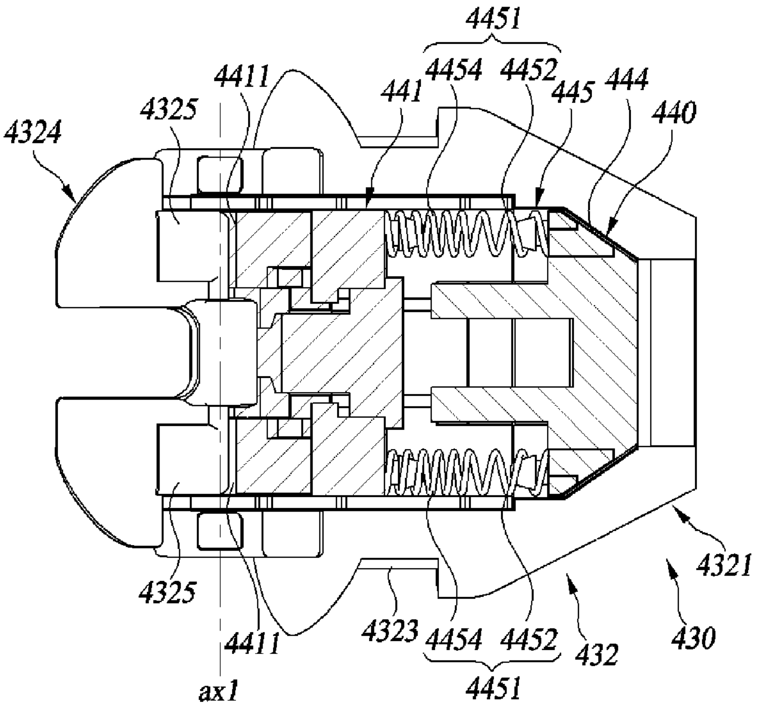
FIG. 13 illustrates the razor handle and the recovering force-providing unit combined for providing a razor cartridge with a rest position to take according to the fourth embodiment of the present disclosure.

FIG. 13 illustrates the razor handle 430 and the recovering force-providing unit 440 combined for providing a razor cartridge (not shown) with a rest position to take according to the fourth embodiment of the present disclosure.

Figure 14:
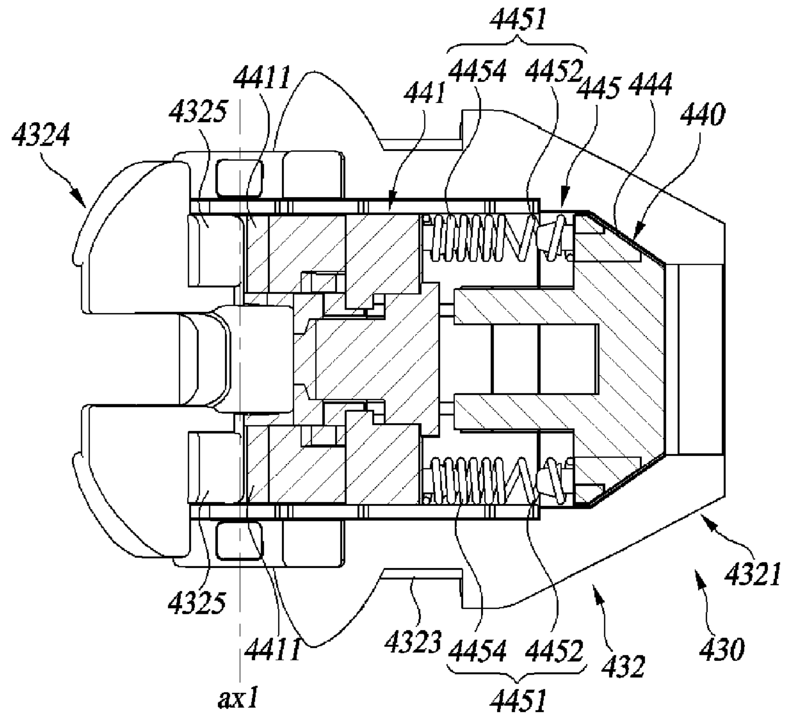
FIG. 14 illustrates the razor handle and the recovering force-providing unit positioning the razor cartridge in a first pivot section according to the fourth embodiment of the present disclosure.

FIG. 14 illustrates the razor handle 430 and the recovering force-providing unit 440 positioning the razor cartridge in a first pivot section according to the fourth embodiment of the present disclosure.

Figure 15:
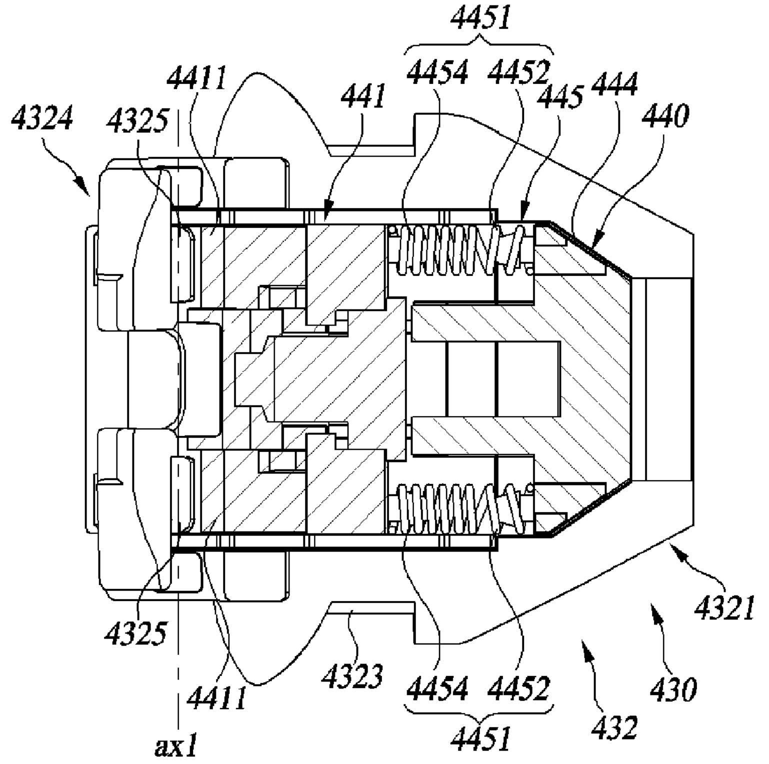
FIG. 15 illustrates the razor handle and the recovering force-providing unit positioning the razor cartridge in a second pivot section according to the fourth embodiment of the present disclosure.

FIG. 15 illustrates the razor handle 430 and the recovering force-providing unit 440 positioning the razor cartridge in a second pivot section according to the fourth embodiment of the present disclosure.

As illustrated in FIGS. 13 to 15, the razor cartridge (not shown) may be enabled to rotate with respect to the razor handle 430 within a predetermined rotation range around the first rotational axis ax1 parallel to the longitudinal direction.

The rotation range may include a first pivot section spanning from the rest position to the first angle and a second pivot section spanning from the first angle to a second angle greater than the first angle. Here, the angles of the razor cartridge, such as the first angle and the second angle, are values measured based on the rest position of the razor cartridge. For example, when the razor cartridge is in the rest position, the angle of the razor cartridge is 0 degrees.

As illustrated in FIGS. 13 and 14, when the razor cartridge is rotated from the rest position to an angle within the first pivot section, the plunger 441 may move backward by camming between the first cam surfaces 4325 and the second cam surfaces 4411.

The third elastic member 445 may be compressed by the plunger 441 moving backward. When the third elastic member 445 is compressed by the movement of the plunger 441, its first elastic areas 4452 and second elastic areas 4454 may be compressed at the same time.

When the razor cartridge is rotating within the first pivot section, since the first elastic areas 4452 and the second elastic areas 4454 are yet to reach their compression limit, they may be deformed more as the razor cartridge rotates further. Accordingly, the recovering force respectively generated by the first elastic areas 4452 and the second elastic areas 4454 may increase as the rotation angle of the razor cartridge increases in the first pivot section.

As shown in FIGS. 14 and 15, when the razor cartridge is rotated from the first pivot section to an angle within the second pivot section, the plunger 441 may move further backward by camming between the first cam surfaces 4325 and the second cam surfaces 4411.

Meanwhile, within the second pivot section, the second elastic areas 4454 may have reached their compression limit. In other words, within the second pivot section, the second elastic areas 4454 may exhibit substantially no more compression. The second elastic areas 4454 may have their compression limit at a first angle that is a boundary angle between the first pivot section and the second pivot section.

Accordingly, when the plunger 441 moves backward, the first elastic areas 4452 may continue to be compressed with no compression occurring in the second elastic areas 4454.

In the second pivot section, since no compression is made in the second elastic areas 4454, the increase in resilience force due to an increase in the rotation angle of the razor cartridge in the second pivot section may be achieved substantially only by increasing the degree of compression of the first elastic areas 4452.

Meanwhile, an increasing rate of the restoration force according to an increase in the rotation angle of the razor cartridge may be distinctive between the first pivot section and the second pivot section. For example, an increasing rate of the recovering force according to an increase in the rotation angle of the razor cartridge may be greater in the second pivot section than in the first pivot section.

In this case, similar to the description provided above in Equation 2 of FIG. 7, the rate of increase of the recovering force in the second pivot section may be determined entirely by the spring constant of the first elastic areas 4452.

Figure 16:
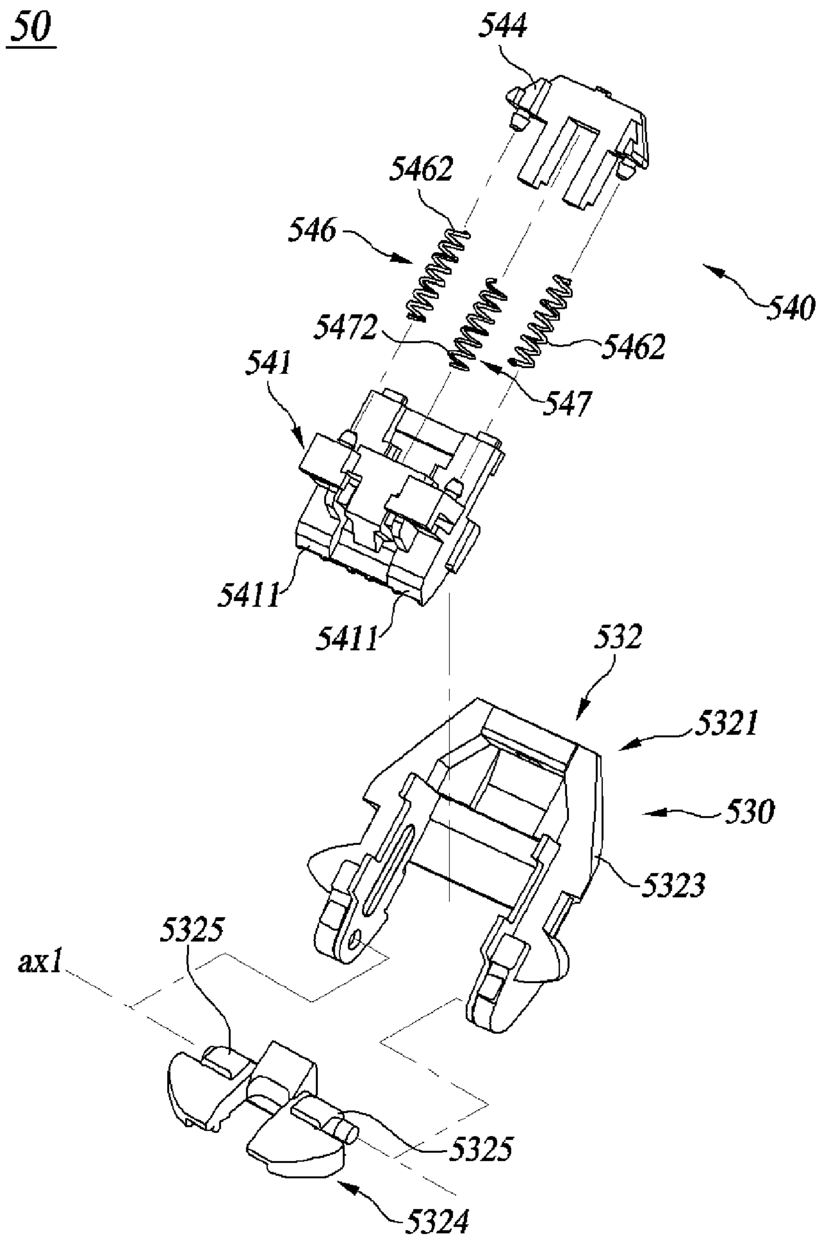
FIG. 16 is an exploded perspective view of a razor handle and a recovering force-providing unit according to a fifth embodiment of the present disclosure.

FIG. 16 is an exploded perspective view of a razor handle 530 and a recovering force-providing unit 540 according to the fifth embodiment of the present disclosure.

As shown in FIG. 16, the recovering force-providing unit 540 may include a plunger 541, a fourth elastic member 546, and a fifth elastic member 547.

The razor handle 530 may have a body portion 532 including a body housing 5321 and a connection member 5324. First cam surfaces 5325 may be formed on the bottom side of a razor cartridge (not shown) or on the other side of the connection member 5324. The first cam surfaces 5325 may provide camming with second cam surfaces 5411 formed on one side of the plunger 541.

Through camming between the first cam surfaces 5325 and the second cam surfaces 5411, the rotational motion of the razor cartridge may be converted into a linear motion of the plunger 541, and the linear motion of the plunger 541 may be converted into a rotational motion of the razor cartridge.

Additionally, through the camming between the first cam surfaces 5325 and the second cam surfaces 5411, the recovering force generated from the recovering force-providing unit 540 may be transmitted to the razor cartridge.

The plunger 541 may transmit the recovering force generated from a fourth elastic member 546 and a fifth elastic member 547 to the razor cartridge.

The plunger 541 may be disposed adjacent to the razor cartridge. Second cam surfaces 5411 may be formed on the plunger 541 at one side adjacent to the razor cartridge. The second cam surfaces 5411 may provide camming with the first cam surfaces 5325 formed on the bottom side of the razor cartridge or the other side of the connecting member 5324.

The plunger 541 may linearly move forward or backward through the camming between the first cam surfaces 5325 and the second cam surfaces 5411. The plunger 541 may compress, through its linear motion, the fourth elastic member 546 and the fifth elastic member 547.

The fourth elastic member 546 may be elastically deformed by being compressed by the plunger 541, thereby generating the recovering force.

The fourth elastic member 546 may have one side adjacent to the razor cartridge and connected to the plunger 541 at its other side spaced apart from the razor cartridge.

Additionally, the fourth elastic member 546 may have its other side spaced apart from the razor cartridge and connected to the plunger guide 544 at its one side adjacent to the razor cartridge or connected to one side of the body housing 5321 of the body portion 532.

When the recovering force-providing unit 540 includes the plunger guide 544, the plunger guide 544 may have the other side spaced apart from the razor cartridge and supported by the one side of the body housing 5321 of the body portion 532. In other words, the plunger guide 544 may be fixed in position.

The fourth elastic member 546 may be compressed by the plunger 541 linearly moving backward. In this case, an elastic force may be generated in the fourth elastic member 546 by elastic deformation. The elastic force of the fourth elastic member 546 may function as a recovering force for restoring the razor cartridge to a rest position.

The fourth elastic member 546 may include, but not be limited to, springs 5462. Accordingly, the fourth elastic member 546 may include an elastic body other than a spring, for example, a rubber member (not shown).

The fifth elastic member 547 may be elastically deformed by being compressed by the plunger 541, thereby generating the recovering force.

The fifth elastic member 547 may have one side adjacent to the razor cartridge and connected to the plunger 541 at the other side spaced apart from the razor cartridge.

Meanwhile, the fifth elastic member 547 may have the other side spaced apart from the razor cartridge and connected to no other members. The fifth elastic member 547 may have the other side facing the plunger guide 544 at its one side adjacent to the razor cartridge or facing one side of the body housing 5321.

When the recovering force-providing unit 540 includes the plunger guide 544, the plunger guide 544 may have the other side spaced apart from the razor cartridge and supported by the one side of the body housing 5321. In other words, the plunger guide 544 may be fixed in position.

In the first pivot section, the other side of the fifth elastic member 547 may be spaced apart from the one side of the plunger guide 544 or the one side of the body housing 5321. Therefore, in the first pivot section, since the other side of the fifth elastic member 547 is supported by no other members, the fifth elastic member 547 is not compressed.

Whereas, in the second pivot section, the other side of the fifth elastic member 547 may contact the one side of the plunger guide 544 or the one side of the body housing 5321. Therefore, in the second pivot section, since the other side of the fifth elastic member 547 is supported by another member, the fifth elastic member 547 may be compressed.

Accordingly, in the second pivot section, the fifth elastic member 547 may be compressed by the plunger 541 linearly moving backward. In this case, an elastic force may be generated in the fifth elastic member 547 due to elastic deformation. The elastic force of the fifth elastic member 547 may function as a recovering force for restoring the razor cartridge to a rest position.

The fifth elastic member 547 may include a spring 5472, but the present disclosure is not limited thereto. Therefore, the fifth elastic member 547 may include an elastic body other than a spring, for example, a rubber member (not shown).

The fifth elastic member 547 may include one spring 5472. For example, the fifth elastic member 547 may include a single spring 5472 disposed in a central region of the other side of the plunger 541.

However, the present disclosure is not so limited. For example, the fifth elastic member 547 may include a plurality of springs arranged in series or parallel.

Although FIG. 16 illustrates that the one side of the fifth elastic member 547 is connected to the other side of the plunger 541 and the other side of the fifth elastic member 547 is connected to no other members, the present disclosure is not limited to this configuration.

For example, the present disclosure envisions a configuration that the one side of the fifth elastic member 547 is connected to no other members, while the other side of the fifth elastic member 547 is connected to one side of the plunger guide 544 or one side of the body housing 5321.

In this case, in the first pivot section, one side of the fifth elastic member 547 may be spaced apart from the other side of the plunger 541. Therefore, in the first pivot section, the fifth elastic member 547 is not compressed since one side of the fifth elastic member 547 is not supported by the other side of the plunger 541.

On the other hand, in the second pivot section, one side of the fifth elastic member 547 may contact the other side of the plunger 541. Therefore, in the second pivot section, the fifth elastic member 547 may be compressed since one side of the fifth elastic member 547 is supported by the other side of the plunger 541.

Assuming that the fourth elastic member 546 and the fifth elastic member 547 each include a spring, to allow the fifth elastic member 547 to be compressed only in the second pivot section, the spring 5472 of the fifth elastic member 547 may be configured to be shorter than the spring 5462 of the fourth elastic member 546. However, the present disclosure is not limited to this configuration.

Meanwhile, the fourth elastic member 546 and the fifth elastic member 547 may be disposed in parallel. Here, arranging in parallel means that the fourth elastic members 546 and the fifth elastic members 547 are not substantially arranged in a row.

Figure 17:
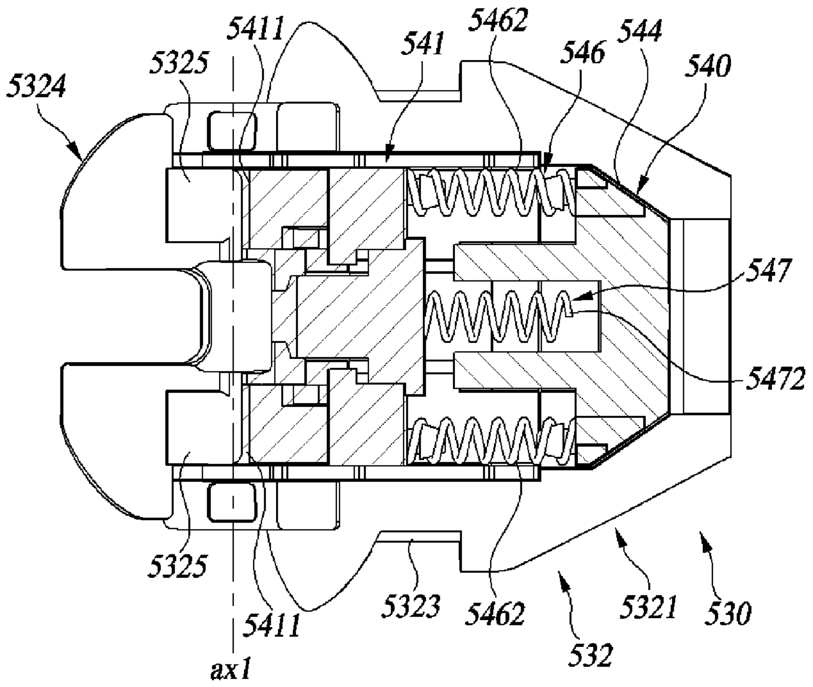
FIG. 17 illustrates the razor handle and the recovering force-providing unit combined for providing a razor cartridge with a rest position to take according to the fifth embodiment of the present disclosure illustrates.

FIG. 17 illustrates the razor handle 530 and the recovering force-providing unit 540 combined for providing a razor cartridge (not shown) with a rest position to take according to the fifth embodiment of the present disclosure illustrates.

Figure 18:
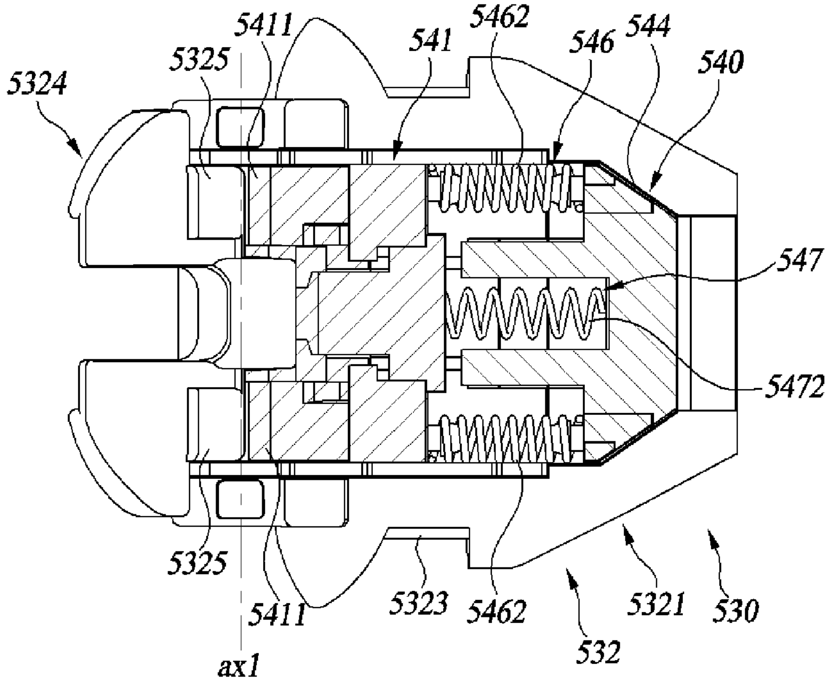
FIG. 18 illustrates the razor handle and the recovering force-providing unit positioning the razor cartridge in a first pivot section according to the fifth embodiment of the present disclosure.

FIG. 18 illustrates the razor handle 530 and the recovering force-providing unit 540 positioning the razor cartridge in the first pivot section according to the fifth embodiment of the present disclosure.

Figure 19:
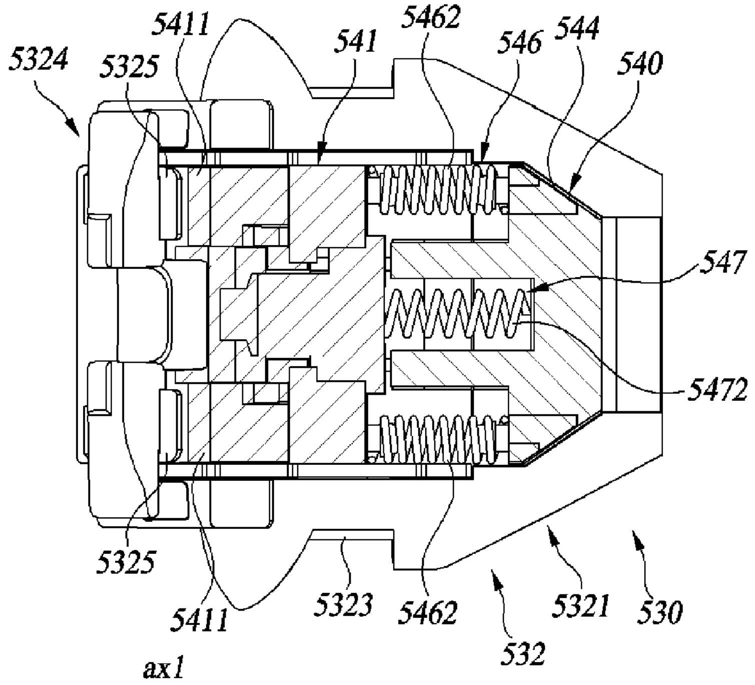
FIG. 19 illustrates the razor handle and the recovering force-providing unit positioning the razor cartridge in a second pivot section according to the fifth embodiment of the present disclosure.

FIG. 19 illustrates the razor handle 530 and the recovering force-providing unit 540 positioning the razor cartridge in the second pivot section according to the fifth embodiment of the present disclosure.

As illustrated in FIGS. 17 to 19, the razor cartridge (though not shown) may be enabled to rotate with respect to the razor handle 530 within a predetermined rotation range around the first rotational axis ax1 parallel to the longitudinal direction.

The rotation range of the razor cartridge may include a first pivot section spanning from a rest position to a first angle and a second pivot section spanning from the first angle to a second angle greater than the first angle. Here, the angles of the razor cartridge, such as the first angle and the second angle, are values measured based on the rest position of the razor cartridge. For example, when the razor cartridge is in the rest position, the angle of the razor cartridge is 0 degrees.

As shown in FIGS. 17 and 18, when the razor cartridge is rotated from the rest position to an angle within the first pivot section, the plunger 541 may move backward through the camming between the first cam surfaces 5325 and the second cam surfaces 5411.

The fourth elastic member 546 may be compressed by the plunger 541 moving backward. The fourth elastic member 546 may be compressed by the movement of the plunger 541. In this case, since the other side of the fifth elastic member 547 is supported by no other members, the fifth elastic member 547 is not compressed.

When the razor cartridge is rotating within the first pivot section, since the fourth elastic member 546 is yet to reach the compression limit, it may be further compressed as the razor cartridge rotates further.

Accordingly, the recovering force generated by the fourth elastic member 546 may increase as the rotation angle of the razor cartridge increases in the first pivot section.

On the other hand, in the first pivot section, since the fifth elastic member 547 exhibits no compression, the increase in recovering force due to an increase in the rotation angle of the razor cartridge in the first pivot section may be achieved substantially only by increasing the degree of compression of the fourth elastic member 546.

As shown in FIGS. 18 and 19, when the razor cartridge is rotated from the first pivot section to an angle within the second pivot section, the plunger 541 may be moved further rearward by camming between the first cam surfaces 5325 and the second cam surfaces 5411.

Meanwhile, within the second pivot section, the other side of the fifth elastic member 547 may be supported by the one side of the plunger guide 544 or the one side of the body housing 5321. Accordingly, within the second pivot section, the fifth elastic member 547 may be compressed. The fifth elastic member 547 may start compression at a first angle that is a boundary angle between the first pivot section and the second pivot section. Therefore, when the plunger 541 moves backward, the fourth elastic member 546 and the fifth elastic member 547 may be compressed at the same time.

Each of the recovering forces generated by the fourth elastic member 546 and the fifth elastic member 547 may increase in the second pivot section as the rotation angle of the razor cartridge increases.

Meanwhile, an increasing rate of the recovering force according to an increase in the rotation angle of the razor cartridge may be distinctive between the first pivot section and the second pivot section. For example, an increasing rate of the recovering force according to an increase in the rotation angle of the razor cartridge may be greater in the second pivot section than in the first pivot section. A detailed description related thereto is presented referring to FIG. 20.

Figure 20:
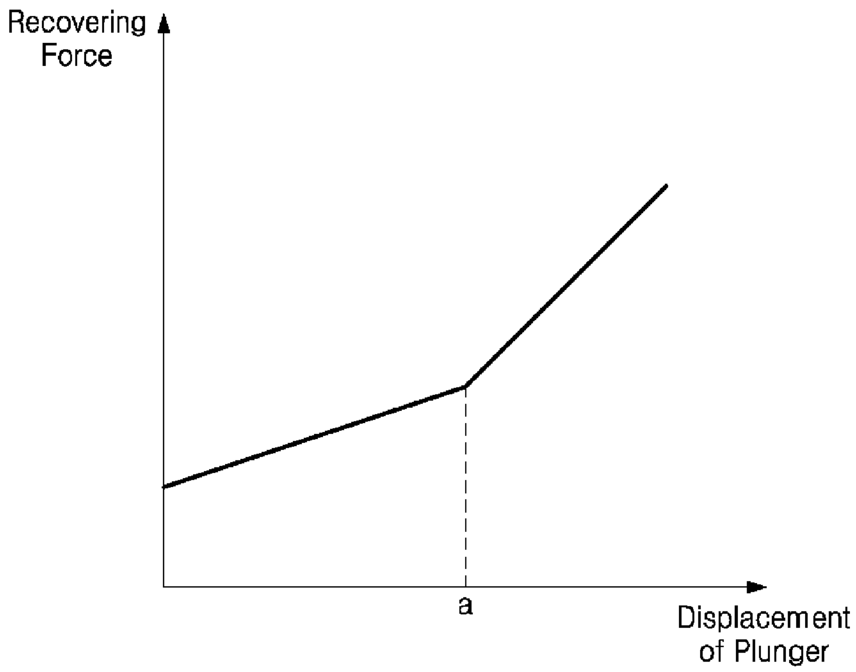
FIG. 20 is a graph showing the magnitude of recovering force according to the displacement of a plunger of a razor assembly according to the fifth embodiment of the present disclosure.

FIG. 20 is a graph showing the magnitude of the recovering force according to the displacement of the plunger 541 of a razor assembly 50 according to the fifth embodiment of the present disclosure.

In FIG. 20, the displacement of the plunger 541 refers to the distance traveled by the plunger 541 as the razor cartridge rotates based on the position of the plunger 541 at which the razor cartridge takes a rest position.

As shown in FIG. 20, when the razor cartridge is in the rest position, the displacement of the plunger 541 is zero. However, since the fourth elastic member 546 is in a preloaded state, the recovering force-providing unit 540 may provide an initial recovering force to the razor cartridge.

When the razor cartridge rotates within the first pivot section, as the rotation angle of the razor cartridge increases, the displacement of the plunger 541 may increase. Specifically, the plunger 541 may move to a first distance ‘a’ from the first angle which is a boundary angle between the first pivot section and the second pivot section.

In the first pivot section, since the fourth elastic member 546 is yet to reach the compression limit, as the rotation angle of the razor cartridge increases, the fourth elastic member 546 may be compressed more.

On the other hand, assuming that the fourth elastic member 546 includes two fifth springs 5462 and the fifth elastic member 547 includes a sixth spring 5472, since the fifth elastic member 542 exhibits no compression, the spring constant of the entire spring system composed of the fourth elastic member 546 and the fifth elastic member 547 may satisfy, in the first pivot section, Equation 3 below.

$$K4=2KD,$$

$$KT1=K4=2KD \quad \text{Equation 3}$$

Here, K4 denotes the spring constant of the fourth elastic member, KD the spring constant of the fifth spring, and KT1 the spring constant of the entire spring system in the first pivot section.

As shown in Equation 3, the rate of increase of the recovering force in the first pivot section may be determined entirely by the spring constant of the fifth spring 5462 of the fourth elastic member 546. Accordingly, to boost the rate of increase of the recovering force in the first pivot section, the spring constant of the fifth spring 5462 may be designed to be larger than that of the sixth spring 5462.

However, the present disclosure is not limited to this configuration, and the spring constant of the fifth spring 5462 may be made smaller than or the same as the spring constant of the sixth spring 5472.

On the other hand, since the magnitude of the recovering force corresponds to the magnitude of the elastic force generated from the fourth elastic member 546, the slope of the recovering force according to the displacement of the plunger 541 in the first pivot section is proportional to spring constant KT1.

When the razor cartridge rotates within the second pivot section, as the rotation angle of the razor cartridge increases, the displacement of the plunger 541 may increase further.

In the second pivot section, the other side of the fifth elastic member 547 may be supported by the one side of the plunger guide 544 or the one side of the body housing 5321, through which the fifth elastic member 547 may be compressed.

In the second pivot section, since both the fourth elastic member 546 and the fifth elastic member 547 are yet to reach the compression limit, as the rotation angle of the razor cartridge increases, the fourth elastic member 546 and the fifth elastic member 547 may be compressed more.

On the other hand, assuming that the fourth elastic member 546 includes three fifth springs 5462 and the fifth elastic member 547 includes a sixth spring 5472, since the fourth elastic member 546 and the fifth elastic member 547 are arranged in parallel, the spring constant of the entire spring system composed of the fourth elastic member 546 and the fifth elastic member 547 may satisfy, in the second pivot section, Equation 4 below.

$$K5=KE,$$

$$KT2=K4+K5=2KD+KE \quad \text{Equation 4}$$

Here, K5 denotes the spring constant of the fifth elastic member, KE the spring constant of the sixth spring, and KT2 the spring constant of the entire spring system in the second pivot section.

As shown in Equation 4, since both K4 and K5 are positive numbers, KT2 is bound to be greater than KT1. This result is due to the property that when two springs are arranged in parallel, the spring constant of the entire spring system becomes larger than the larger of the spring constants of the two springs.

Since the magnitude of the recovering force corresponds to the magnitude of the elastic force generated from the fourth elastic member 546 and the fifth elastic member 547, in the second pivot section, the slope of the recovering force according to the displacement of the plunger 541 is proportional to spring constant KT2.

Since KT2 has a larger value than KT1, the slope of the recovering force in the second pivot section may be steeper than that in the first pivot section. In other words, the rate of increase of the recovering force according to the increase in the rotation angle of the razor cartridge may be greater in the second pivot section than in the first pivot section.

A sixth embodiment of the present disclosure illustrated in FIG. 21 to be described below differs from the second through fifth embodiments of the present disclosure shown in FIGS. 3 to 20, in that the recovering force-providing portion includes an elastic member disposed on the side of the razor cartridge. The following focuses on the distinctive features according to the sixth embodiment of the present disclosure, omitting a repetitive description of the configuration substantially the same as the previous description.

Figure 21:
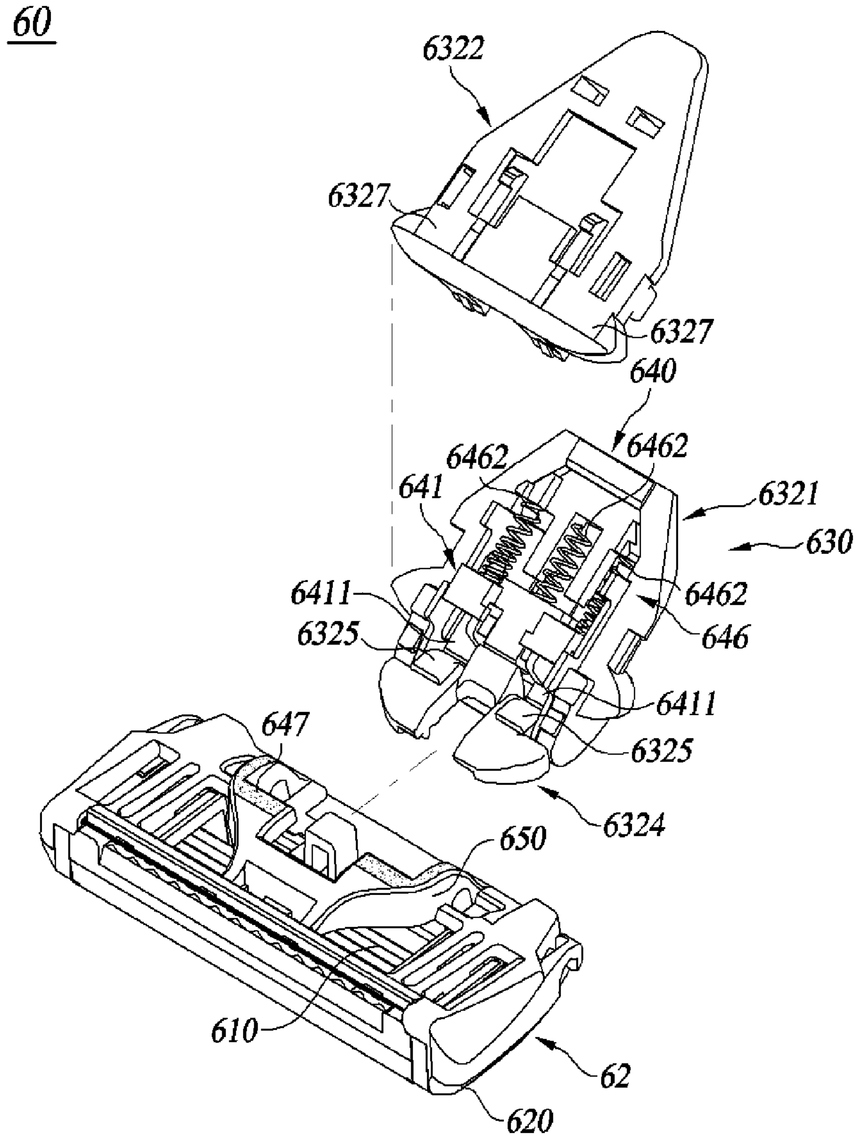
FIG. 21 is a rear perspective view of a razor cartridge and a recovering force-providing unit according to a sixth embodiment of the present disclosure.

FIG. 21 is a rear perspective view of a razor cartridge 62 and a recovering force-providing unit 640 according to the sixth embodiment of the present disclosure.

As shown in FIG. 21, the recovering force-providing unit 640 may include a plunger 641, a fourth elastic member 646, and a fifth elastic member 647.

The fifth elastic member 647 according to the sixth embodiment of the present disclosure may be disposed on the razor cartridge 62 at its connector 650, and in particular, one side of a connector 650 that is disposed on one side or the bottom side of the razor cartridge 62. However, the fifth elastic member 647 is not limited to this position, and it may be disposed at other positions than the one side of the connector 650 as long as it can terminate a first pivot section of the razor cartridge 62.

For example, in an embodiment in which the connector 650 is configured to rotate with respect to the razor cartridge 62, the fifth elastic member 647 may be formed on the one side of the razor cartridge 62. Additionally, in a shell bearing type embodiment in which a razor handle 630 is directly connected to the razor cartridge 62 without the connector 650, the fifth elastic member 647 may be formed on some of a guide track.

Meanwhile, the fifth elastic member 647 may be made of a rubber material.

The razor assembly 60 according to the sixth embodiment of the present disclosure includes stopper areas 6327.

The stopper areas 6327 may be formed on some of the body housing 6321, for example, on an upper segment 6322 or the plunger 641. However, the stopper areas 6327 are not limited to this position, and they may be formed in other positions than the upper segment 6322 and the plunger 641 as long as they can terminate the first pivot section of the razor cartridge 62.

For example, in an embodiment in which the connector 650 is configured to rotate with respect to the razor cartridge 62, the stopper areas 6378 may be formed on one side of the connector 650. Additionally, in a shell bearing type embodiment in which the razor handle 630 is directly connected to the razor cartridge 62 without the connector 650, the stopper areas 6327 may be formed on one side of a guide protrusion.

In some embodiments, the position of the fifth elastic member 647 and the position of the stopper areas 6327 are opposite to those described above. For example, although FIG. 21 illustrates that the fifth elastic member 647 is disposed on one side of the connector 650 and the stopper areas 6327 are formed on the upper segment 6322, some embodiments arrange the stopper areas 6327 to be disposed on one side of the connector 650 and the fifth elastic member 647 to be formed on the upper segment 6322. The rear surface of the razor cartridge 62 or the other side of a connecting member 6324 may be formed with first cam surfaces 6325. The first cam surfaces 6325 may provide camming with second cam surfaces 6411 formed on one side of the plunger 641.

Through the camming between the first cam surfaces 6325 and the second cam surfaces 6411, the rotational motion of the razor cartridge 62 may be converted into a linear motion of the plunger 641, and the linear motion of the plunger 641 may be converted into a rotational motion of the razor cartridge 62.

Additionally, through the camming between the first cam surfaces 6325 and the second cam surfaces 6411, the recovering force generated from the recovering force-providing unit 640 may be transmitted to the razor cartridge 62.

The plunger 641 may transmit the recovering force generated from the fourth elastic member 646 to the razor cartridge 62.

The second cam surfaces 6411 may be formed on the plunger 641 at one side adjacent to the razor cartridge 62. The second cam surfaces 6411 may provide camming with the first cam surfaces 6325 formed on the rear surface of the razor cartridge 62 or the other side of the connecting member 6324.

The plunger 641 may linearly move forward or backward through the camming between the first cam surfaces 6325 and the second cam surfaces 6411. The plunger 641 may compress, through its linear motion, the fourth elastic member 646.

The fourth elastic member 646 may be elastically deformed by being compressed by the plunger 641, thereby generating the recovering force.

The fourth elastic member 646 may be compressed by the plunger 641 linearly moving backward. In this case, an elastic force may be generated inside the fourth elastic member 646 by elastic deformation. The elastic force of the fourth elastic member 646 may function as a recovering force for restoring the razor cartridge 62 to a rest position.

The fourth elastic member 646 may include, but not be limited to, springs 6462. Accordingly, the fourth elastic member 646 may include an elastic body other than a spring, for example, a rubber member (not shown).

The fifth elastic member 647 may be elastically deformed by contacting the stopper areas 6328 of the razor handle 630, thereby generating the recovering force.

In the first pivot section, the fifth elastic member 647 disposed on the connector 650 may be spaced apart from the stopper areas 6328. In other words, in the first pivot section, since the fifth elastic member 647 is not supported at its other side by the stopper areas 6328, the fifth elastic member 647 is not compressed.

On the other hand, in the second pivot section, the fifth elastic member 647 may contact the stopper areas 6328. Specifically, in the second pivot section, since the fifth elastic member 647 is supported by the stopper areas 6328, the fifth elastic member 647 can be compressed.

Accordingly, in the second pivot section, the fifth elastic member 647 may be compressed when the razor cartridge 62 rotates within the second pivot section. In this case, an elastic force may be generated inside the fifth elastic member 647 by elastic deformation. The elastic force of the fifth elastic member 647 may function as a recovering force for restoring the razor cartridge 62 to the rest position.

On the other hand, the fourth elastic member 646 and the fifth elastic member 647 are not substantially arranged in a row. Therefore, it can be seen that the fourth elastic member 646 and the fifth elastic member 647 are arranged in parallel.

Accordingly, as in the fifth embodiment of the present disclosure in which the elastic members are arranged in parallel, the sixth embodiment arranges the rate of increase of the recovering force according to the increase of the rotation angle of the razor cartridge 62 to be greater in the second pivot section than in the first pivot section.

The razor assembly 60 according to the sixth embodiment of the present disclosure applies a coating of an elastic body, for example, a rubber material on the connector 650 of the razor cartridge 62, and thereby implements distinctive rotation characteristics between the first pivot section and the second pivot section, providing a relatively simple structure over those of the second through fifth embodiments of the present disclosure.

Figure 22:
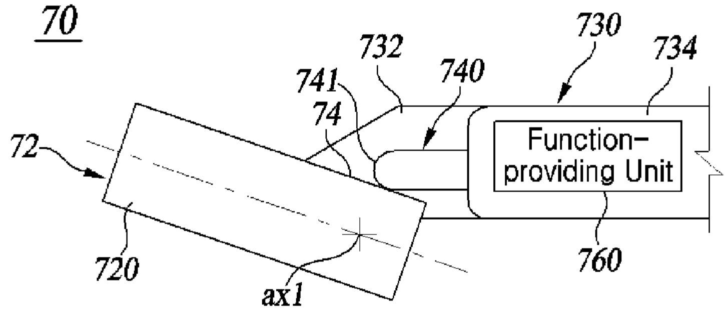
FIG. 22 illustrates a razor cartridge when positioned in a first pivot section and a second pivot section, according to a seventh embodiment of the present disclosure.
Figure 22:
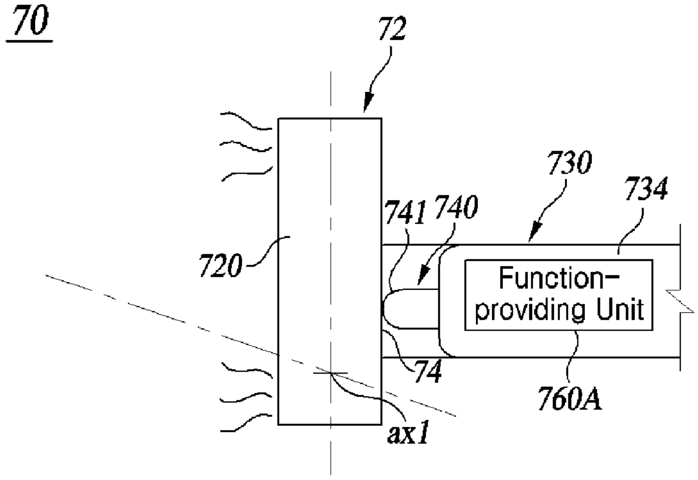
Figure 22:
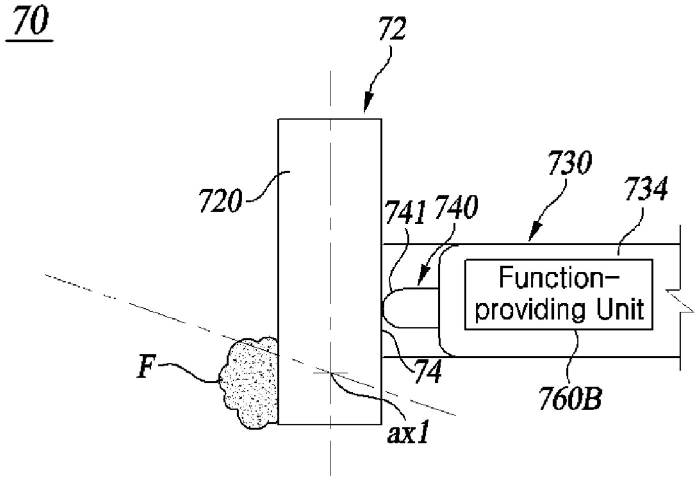

The following describes a seventh embodiment of the present disclosure illustrated in FIG. 22 which differs from the second through sixth embodiments of the present disclosure shown in FIGS. 3 to 21, in that a razor assembly includes a function-providing unit. The following focuses on the distinctive features according to the seventh embodiment of the present disclosure, omitting a repetitive description of the configuration substantially the same as the previous description.

FIG. 22 illustrates a razor cartridge 72 when positioned in a first pivot section and a second pivot section, according to a seventh embodiment of the present disclosure.

FIG. 22 shows at (a) the razor cartridge 72 according to the seventh embodiment of the present disclosure taking a first pivot section.

FIG. 22 shows at (b) and (c) the razor cartridge 72 according to the seventh embodiment of the present disclosure taking a second pivot section.

Specifically, FIG. 22(*b*) illustrates that a function-providing unit 760A provides a heating function in the second pivot section, and FIG. 22(*c*) illustrates that a function-providing unit 760B provides a shaving aid jetting function in the second pivot section.

As shown in FIG. 22 at (a) to (c), the razor assembly 70 may include a function-providing unit 760.

The function-providing unit 760 may provide a shaving function to the razor cartridge 72 in the second pivot section. The shaving function provided by the function-providing unit 760 may include at least one of the heating function and the shaving aid jetting function.

Here, the heating function refers to a function of warming at least some of the razor cartridge 72, and the shaving aid jetting function refers to a function of ejecting a shaving aid on the razor cartridge 72.

The shaving function provided from the function-providing unit 760 may be arranged to be provided only when the razor cartridge 72 remains rotated within the second pivot section. However, the present disclosure is not so limited.

For example, provision of the shaving function may be arranged to begin right when the razor cartridge 72 rotates beyond the first angle and remain until a certain figure (e.g., the temperature of the razor cartridge) reaches a specific value or until a predetermined time elapses.

To operate the function-providing unit 760 during shaving, the user may rotate the razor cartridge 72 by an angle within the second pivot section, which is a relatively large angle.

Specifically, to operate the function-providing unit 760, other than the rotation of the razor cartridge 72, no operations, for example, pressing a button or sliding of a button are required. Accordingly, the razor assembly 70 according to the seventh embodiment of the present disclosure allows the user to easily operate the function-providing unit (not shown) even during shaving.

As shown in FIG. 22(*b*), the function-providing unit 760A may provide a heating function when the razor cartridge 72 is rotating within the second pivot section.

The heating function may be performed by applying an electric current to a resistance pattern (not shown) formed on the razor cartridge 72. For example, the electric current may be arranged to be applied to the resistance pattern only when the razor cartridge 72 is rotated within the second pivot section. However, the present disclosure is not so limited.

A part of the razor cartridge 72 to be in contact with the user's skin may be heated through the heating function. The user may receive a feeling of warmth from the razor cartridge 72 by contacting the heated razor cartridge 72 with the user's skin. This enables the user to perform smoother shaving.

As shown in FIG. 22(*c*), the function-providing unit 760B may provide the shaving aid jetting function when the razor cartridge 72 is rotating within the second pivot section.

The shaving aid jetting function may be achieved by adjusting a valve (not shown) disposed between a shaving aid containing unit (not shown) and a jetting portion (not shown) formed on the razor cartridge 72. For example, the opening and closing of the valve may be arranged to be adjusted only when the razor cartridge 72 is rotated within the second pivot section. However, the present disclosure is not so limited.

A shaving aid F ejected through the function-providing unit 760B may be applied to the user's skin. Shaving aid F applied to the skin can minimize undesirable irritation that may occur on the user's skin during shaving, thereby allowing the user to perform a smoother shave.

Although FIG. 22 illustrates at (b) and (c) the function-providing unit 760 as having the heating function or shaving aid jetting function, the present disclosure is not limited thereto. Accordingly, the function-providing unit 760 may be configured to provide other shaving functions than the above-described functions.

On the other hand, the razor assembly 70 according to the seventh embodiment of the present disclosure is configured such that the rate of increase of the resilience force according to an increase in the rotation angle of the razor cartridge 72 has distinctive values between the first pivot section and the second pivot section. In this case, the seventh embodiment can employ the configurations of the second to sixth embodiments of the present disclosure.

As described above, according to some embodiments of the present disclosure, the razor assembly is configured to have two pivot sections having rotation characteristics of distinctive ranges of rotation of the razor cartridge, thereby providing smoother shaving to the user.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A razor assembly, comprising:

a razor cartridge including at least one shaving blade having a cutting edge and a blade housing configured to receive the at least one shaving blade in a longitudinal direction;

a razor handle connected to the razor cartridge and configured to be rotatable about a rotational axis parallel to the longitudinal direction within a predetermined rotation range;

an elastic component assembly coupled to the razor cartridge and configured to rotate the razor cartridge about the rotational axis, the razor cartridge configured to rotate from a rest position and the elastic component assembly configured to return the razor cartridge to the rest position with a recovering force, the elastic component assembly comprising:

a plunger guide, the plunger guide comprising:

a first protrusion and a second protrusion extending from a first side of the plunger guide, the first protrusion spaced apart from the second protrusion in the longitudinal direction, and a third protrusion extending from a second side of the plunger guide, the first side opposite to the second side along a lateral direction perpendicular to the longitudinal direction;

a first elastic member, the first elastic member including a first spring, a second spring, and a third spring arranged in parallel, wherein the first spring is coupled to the first protrusion, wherein the second spring is coupled to the second protrusion, and wherein the third spring is spaced apart from and disposed between the first spring and the second spring; and a second elastic member, wherein the first elastic member and the second elastic member are configured to compress in a compressing direction parallel to the lateral direction, wherein the second elastic member is spaced apart from the first elastic member along the compressing direction, wherein the second elastic member includes a fourth spring coupled to the third protrusion, wherein the third spring and the fourth spring are aligned along the lateral direction, wherein a portion of the plunger guide is interposed between the third spring and the fourth spring so that the third spring and the fourth spring are not directly coupled to each other, and wherein the plunger guide is disposed between and interconnects the first elastic member and the second elastic member along the compressing direction, the second elastic member configured to be elastically deformed by the plunger guide, wherein the predetermined rotation range comprises:

a first pivot range spanning from the rest position to a first angle about the rotational axis, and a second pivot range spanning from the first angle to a second angle greater than the first angle about the rotational axis, wherein the first elastic member is configured to at least partially compress in the compressing direction in the first pivot range and fully compress in the compressing direction in the second pivot range, wherein the second elastic member is configured to partially compress in the compressing direction in the first pivot range and the second pivot range, wherein the recovering force is configured to increase as the razor cartridge rotates in the predetermined rotation range, wherein the recovering force is configured to increase at a first increasing rate in the first pivot range and increase at a second increasing rate, different from the first increasing rate in the second pivot range, wherein each of the first spring, the second spring, and the third spring of the first elastic member has a different stiffness than the fourth spring of the second elastic member, and wherein the plunger guide is configured to be pressed by the first elastic member and linearly move, and compress the second elastic member through linear motion.

2. The razor assembly of claim 1, wherein the first angle is 40 to 60 degrees.

3. The razor assembly of claim 1, wherein the second angle is equal to or less than 90 degrees.

4. The razor assembly of claim 1, wherein the fourth spring has a spring constant that is greater than a spring constant of the first spring.

5. The razor assembly of claim 1, wherein the second elastic member is made of an elastic material.

6. The razor assembly of claim 1, wherein:

the first elastic member is configured to generate the recovering force through elastic deformation, the first elastic member includes a first elastic area and a second elastic area, the first elastic area is configured to generate a recovering force that increases in the first pivot range as the razor cartridge rotates with an increasing rotational angle, and the second elastic area is configured to generate a recovering force that increases in the first pivot range and the second pivot range as the razor cartridge rotates with the increasing rotational angle.

7. The razor assembly of claim 6, wherein at least one of the first to third springs of the first elastic member comprises:

a first elastic portion and a second elastic portion extending from the first elastic portion, and wherein the second elastic portion has a spring constant that is greater than a spring constant of the first elastic portion.

8. The razor assembly of claim 1, wherein:

the first elastic member and the second elastic member are configured to generate the recovering force through elastic deformation, the first elastic member is configured to generate a recovering force that increases in the first pivot range and the second pivot range as the razor cartridge rotates with an increasing rotational angle, and the second elastic member is configured to generate a recovering force that increases in the second pivot range as the razor cartridge rotates with the increasing rotational angle.

9. The razor assembly of claim 8, further comprising:

a connector disposed on one side or a bottom side of the razor cartridge and configured to be connected to the razor handle, wherein the second elastic member is disposed on one side of the connector.

10. The razor assembly of claim 9, wherein the second elastic member is made of a rubber material.

11. The razor assembly of claim 1, wherein:

the second elastic member is configured to generate the recovering force through elastic deformation, the second elastic member includes a first elastic portion and a second elastic portion extending from the first elastic portion, the first elastic portion is configured to generate a recovering force that increases in the first pivot range as the razor cartridge rotates with an increasing rotational angle, and the second elastic portion is configured to generate a recovering force that increases in the first pivot range and the second pivot range as the razor cartridge rotates with the increasing rotational angle.

12. The razor assembly of claim 1, wherein the second elastic member comprises a rubber band configured to be deformed under tension by the plunger guide in the compressing direction to generate a recovering force in the first pivot range and the second pivot range.

* * * * *